US011962552B2

(12) United States Patent
Pickman et al.

(10) Patent No.: US 11,962,552 B2
(45) Date of Patent: Apr. 16, 2024

(54) ENDPOINT AGENT EXTENSION OF A MACHINE LEARNING CYBER DEFENSE SYSTEM FOR EMAIL

(71) Applicant: Darktrace Limited, Cambridge (GB)

(72) Inventors: Stephen Pickman, Huntingdon (GB); Matthew Dunn, Cambridgeshire (GB)

(73) Assignee: Darktrace Holdings Limited, Cambridge (GB)

( * ) Notice: Subject to any disclaimer, the term of this patent is extended or adjusted under 35 U.S.C. 154(b) by 500 days.

(21) Appl. No.: 17/004,398

(22) Filed: Aug. 27, 2020

(65) Prior Publication Data

US 2020/0396190 A1 Dec. 17, 2020

Related U.S. Application Data

(63) Continuation-in-part of application No. 16/278,932, filed on Feb. 19, 2019, now Pat. No. 11,606,373.
(Continued)

(51) Int. Cl.
*H04L 29/06* (2006.01)
*G06N 20/00* (2019.01)
(Continued)

(52) U.S. Cl.
CPC .......... *H04L 51/212* (2022.05); *G06N 20/00* (2019.01); *H04L 51/18* (2013.01); *H04L 63/14* (2013.01);
(Continued)

(58) Field of Classification Search
CPC ....... H04L 51/212; H04L 51/18; H04L 63/14; H04L 63/1425; H04L 63/1433;
(Continued)

(56) References Cited

U.S. PATENT DOCUMENTS 6,154,844 A 11/2000 Touboul et al.
6,965,968 B1 11/2005 Touboul
(Continued)

FOREIGN PATENT DOCUMENTS

EP 2922268 A1 9/2015
WO 2001031420 A2 5/2001
(Continued)

OTHER PUBLICATIONS

Gharan, Shayan Oveis, "Lecture 11: Clustering and the Spectral Partitioning Algorithm" May 2, 2016.
(Continued)

*Primary Examiner* — Tu T Nguyen
(74) *Attorney, Agent, or Firm* — Rutan and Tucker, LLP

(57) ABSTRACT

An endpoint agent extension of a cyber defense system for email that includes modules and machine learning models. An integration module integrates with an email client application to detect email cyber threats in emails in the email client application as well as regulate emails. An action module interfaces with the email client application to direct autonomous actions against an outbound email and/or its files when a cyber threat module determines the email and/or its files (a) to be a data exfiltration threat, (b) to be both malicious and anomalous behavior as compared to a user's modeled email behavior, and (c) any combination of these. The autonomous actions can include actions of logging a user off the email client application, preventing the sending of the email, stripping the attached files and/or disabling the link to the files from the email, and sending a notification to cyber security personnel regarding the email.

20 Claims, 9 Drawing Sheets

Related U.S. Application Data

(60) Provisional application No. 62/893,350, filed on Aug. 29, 2019, provisional application No. 62/632,623, filed on Feb. 20, 2018.

(51) Int. Cl.
- *H04L 9/40* (2022.01)
- *H04L 29/08* (2006.01)
- *H04L 51/18* (2022.01)
- *H04L 51/212* (2022.01)
- *H04L 67/306* (2022.01)

(52) U.S. Cl.
CPC ...... *H04L 63/1425* (2013.01); *H04L 63/1433* (2013.01); *H04L 63/1441* (2013.01); *H04L 67/306* (2013.01)

(58) Field of Classification Search
CPC ............... H04L 63/1441; H04L 67/306; H04L 63/1483; H04L 67/10; G06N 20/00
USPC ......................................................... 726/23
See application file for complete search history.

(56) References Cited

U.S. PATENT DOCUMENTS

| | | |
|---|---|---|
| 7,307,999 B1 | 12/2007 | Donaghey |
| 7,418,731 B2 | 8/2008 | Touboul |
| 7,448,084 B1 | 11/2008 | Apap et al. |
| 7,890,869 B1 | 2/2011 | Mayer et al. |
| 8,312,540 B1 | 11/2012 | Kahn et al. |
| 8,661,538 B2 | 2/2014 | Cohen-Ganor et al. |
| 8,819,803 B1 | 8/2014 | Richards et al. |
| 8,879,803 B2 | 11/2014 | Ukil et al. |
| 8,966,036 B1 | 2/2015 | Asgekar et al. |
| 9,043,905 B1 | 5/2015 | Allen et al. |
| 9,106,687 B1 | 8/2015 | Sawhney et al. |
| 9,154,514 B1 * | 10/2015 | Prakash ............... G06Q 10/107 |
| 9,185,095 B1 | 11/2015 | Moritz et al. |
| 9,213,990 B2 | 12/2015 | Adjaoute |
| 9,348,742 B1 | 5/2016 | Brezinski |
| 9,401,925 B1 | 7/2016 | Guo et al. |
| 9,516,039 B1 | 12/2016 | Yen et al. |
| 9,516,053 B1 | 12/2016 | Muddu et al. |
| 9,641,544 B1 | 5/2017 | Treat et al. |
| 9,712,548 B2 | 7/2017 | Shmueli et al. |
| 9,727,723 B1 | 8/2017 | Kondaveeti et al. |
| 10,091,222 B1 * | 10/2018 | Langton ............... H04L 63/1441 |
| 10,237,298 B1 | 3/2019 | Nguyen et al. |
| 10,268,821 B2 | 4/2019 | Stockdale et al. |
| 10,419,466 B2 | 9/2019 | Ferguson et al. |
| 10,516,693 B2 | 12/2019 | Stockdale et al. |
| 10,701,093 B2 | 6/2020 | Dean et al. |
| 11,568,301 B1 * | 1/2023 | Yueh ............... H04L 63/1416 |
| 2002/0174217 A1 | 11/2002 | Anderson et al. |
| 2002/0186698 A1 | 12/2002 | Ceniza |
| 2003/0070003 A1 | 4/2003 | Chong et al. |
| 2004/0083129 A1 | 4/2004 | Herz |
| 2004/0167893 A1 | 8/2004 | Matsunaga et al. |
| 2005/0065754 A1 | 3/2005 | Schaf et al. |
| 2007/0118909 A1 | 5/2007 | Hertzog et al. |
| 2007/0294187 A1 | 12/2007 | Scherrer |
| 2008/0005137 A1 | 1/2008 | Surendran et al. |
| 2008/0077358 A1 | 3/2008 | Marvasti |
| 2008/0109730 A1 | 5/2008 | Coffman et al. |
| 2009/0106174 A1 | 4/2009 | Battisha et al. |
| 2009/0182818 A1 | 7/2009 | Krywaniuk |
| 2009/0228565 A1 | 9/2009 | Kalyan |
| 2009/0254971 A1 | 10/2009 | Herz et al. |
| 2010/0009357 A1 | 1/2010 | Nevins et al. |
| 2010/0095374 A1 | 4/2010 | Gillum et al. |
| 2010/0107254 A1 | 4/2010 | Elland et al. |
| 2010/0125908 A1 | 5/2010 | Kudo |
| 2010/0235908 A1 | 9/2010 | Eynon et al. |
| 2010/0299292 A1 | 11/2010 | Collazo |
| 2011/0093428 A1 | 4/2011 | Wisse |
| 2011/0213742 A1 | 9/2011 | Lemmond et al. |
| 2011/0261710 A1 | 10/2011 | Chen et al. |
| 2012/0096549 A1 | 4/2012 | Amini et al. |
| 2012/0137367 A1 | 5/2012 | Dupont et al. |
| 2012/0151582 A1 | 6/2012 | Reasor et al. |
| 2012/0209575 A1 | 8/2012 | Barbat et al. |
| 2012/0210388 A1 | 8/2012 | Kolishchak |
| 2012/0284791 A1 | 11/2012 | Miller et al. |
| 2012/0304288 A1 | 11/2012 | Wright et al. |
| 2013/0091539 A1 | 4/2013 | Khurana et al. |
| 2013/0198119 A1 | 8/2013 | Eberhardt, III et al. |
| 2013/0198840 A1 | 8/2013 | Drissi et al. |
| 2013/0254885 A1 | 9/2013 | Devost |
| 2014/0007237 A1 | 1/2014 | Wright et al. |
| 2014/0074762 A1 | 3/2014 | Campbell |
| 2014/0165207 A1 | 6/2014 | Engel et al. |
| 2014/0215618 A1 | 7/2014 | Amit |
| 2014/0325643 A1 | 10/2014 | Bart et al. |
| 2015/0067835 A1 | 3/2015 | Chari et al. |
| 2015/0081431 A1 | 3/2015 | Akahoshi et al. |
| 2015/0161394 A1 | 6/2015 | Ferragut et al. |
| 2015/0163121 A1 | 6/2015 | Mahaffey et al. |
| 2015/0172300 A1 | 6/2015 | Cochenour |
| 2015/0180893 A1 | 6/2015 | Im et al. |
| 2015/0213358 A1 | 7/2015 | Shelton et al. |
| 2015/0286819 A1 | 10/2015 | Coden et al. |
| 2015/0310195 A1 | 10/2015 | Bailor et al. |
| 2015/0319185 A1 | 11/2015 | Kirti et al. |
| 2015/0341379 A1 | 11/2015 | Lefebvre et al. |
| 2015/0363699 A1 | 12/2015 | Nikovski |
| 2015/0379110 A1 | 12/2015 | Marvasti et al. |
| 2016/0062950 A1 | 3/2016 | Brodersen et al. |
| 2016/0078365 A1 | 3/2016 | Baumard |
| 2016/0149941 A1 | 5/2016 | Thakur et al. |
| 2016/0164902 A1 | 6/2016 | Moore |
| 2016/0173509 A1 | 6/2016 | Ray et al. |
| 2016/0241576 A1 | 8/2016 | Rathod et al. |
| 2016/0285858 A1 | 9/2016 | Li et al. |
| 2016/0352768 A1 | 12/2016 | Lefebvre et al. |
| 2016/0359695 A1 | 12/2016 | Yadav et al. |
| 2016/0373476 A1 | 12/2016 | Dell'Anno et al. |
| 2017/0034091 A1 * | 2/2017 | Egilmez ............... H04L 51/42 |
| 2017/0054745 A1 | 2/2017 | Zhang et al. |
| 2017/0063907 A1 | 3/2017 | Muddu et al. |
| 2017/0063910 A1 | 3/2017 | Muddu et al. |
| 2017/0063911 A1 | 3/2017 | Muddu et al. |
| 2017/0169360 A1 | 6/2017 | Veeramachaneni et al. |
| 2017/0220801 A1 | 8/2017 | Stockdale et al. |
| 2017/0230391 A1 | 8/2017 | Ferguson et al. |
| 2017/0230392 A1 | 8/2017 | Stockdale |
| 2017/0251012 A1 | 8/2017 | Stockdale et al. |
| 2017/0270422 A1 | 9/2017 | Sorakado |
| 2018/0027006 A1 | 1/2018 | Zimmermann et al. |
| 2018/0167402 A1 | 6/2018 | Scheidler et al. |
| 2018/0183680 A1 | 6/2018 | Chen et al. |
| 2018/0255076 A1 | 9/2018 | Paine |
| 2018/0332054 A1 | 11/2018 | Ford |
| 2019/0036948 A1 | 1/2019 | Appel et al. |
| 2019/0044963 A1 | 2/2019 | Rajasekharan et al. |
| 2019/0251260 A1 | 8/2019 | Stockdale et al. |
| 2020/0280575 A1 | 9/2020 | Dean et al. |
| 2021/0120027 A1 | 4/2021 | Dean et al. |
| 2021/0157919 A1 | 5/2021 | Stockdale et al. |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |

OTHER PUBLICATIONS

Nikolystylfw, "Can Senseon beat Darktrace at its very own game with its 'An I triangulation' modern technology?" Dec. 22, 2018, nikolystylfw.

(56) References Cited

OTHER PUBLICATIONS

Lunden, Ingrid, "Senseon raises $6.4M to tackle cybersecurity threats with an AI 'triangulation' approach" Feb. 19, 2019, Tech Crunch.
Senseon Tech Ltd., "The State of Cyber Security SME Report 2019," Jun. 3, 2019.
Senseon Tech Ltd., "Technology," * please see the statement filed herewith.
Senseon Tech Ltd., "Senseon & You," * please see the statement filed herewith.
Senseon Tech Ltd., "Technology Overview," * please see the statement filed herewith.
Senseon Tech Ltd., "Senseon Enterprise," * please see the statement filed herewith.
Senseon Tech Ltd., "Senseon Pro," * please see the statement filed herewith.
Senseon Tech Ltd., "Senseon Reflex," * please see the statement filed herewith.
Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.
Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.
Non-Final Office Action for U.S. Appl. No. 16/279,039 dated Jun. 18, 2021, 22 pages.
Final Office Action for U.S. Appl. No. 16/279,039 dated Jan. 24, 2022, 17 pages.
European Patent Office, European Search Report, dated Jan. 27, 2021, Munich, Germany.

* cited by examiner

ENDPOINT AGENT EXTENSION OF A MACHINE LEARNING CYBER DEFENSE SYSTEM FOR EMAIL

RELATED APPLICATION

This application claims priority to and the benefit of under 35 USC 119 of U.S. provisional patent application titled "A cyber defense system with various improvements, " filed Aug. 29, 2019, Ser. No. 62/893,350, which is incorporated herein by reference in its entirety. In addition, this application claims priority to and the benefit as a continuation in part application of under 35 USC 121 of U.S. patent application titled "A cyber defense system protecting email networks with machine learning models" filed Feb. 19, 2019, Ser. No. 16/278,932, which claims the benefit of under 35 USC 119 to U.S. provisional patent application titled "A cyber defense system with various improvements," filed Feb. 20, 2018, Ser. No. 62/632,623, which is incorporated herein by reference in its entirety.

FIELD

Embodiments of the design provided herein generally relate to a cyber defense system. In an embodiment, Artificial Intelligence analyzes Cyber Security threats coming from and/or associated with an email.

BACKGROUND

In the cyber security environment, firewalls, Antivirus security methods and other tools currently form an important part of an organization's cyber defense strategy, but they are insufficient in the new age of cyber threat.

SUMMARY

In an embodiment, a cyber defense system protects a system from cyber threats coming from and/or associated with an email and/or an email system. In an embodiment, an endpoint agent extension of a cyber defense system for email includes two or more modules and one or more machine learning models. An integration module of the endpoint agent extension integrates with an email client application on an endpoint computing device to detect email cyber threats in emails in the email client application as well as regulate outbound emails. An action module of the endpoint agent extension interfaces with the email client application to direct autonomous actions, by the action module rather than a human taking an action, against at least an outbound email including its attached files and/or linked files under analysis when a cyber threat module determines the outbound email including its attached files and/or linked files (a) to be a data exfiltration threat, (b) to be both malicious and anomalous behavior as compared to a user's modeled email behavior, and (c) any combination of these two determinations. The autonomous actions, against at least the outbound email and the files, include one or more actions of i) logging a user off the email client application, ii) preventing the sending of the outbound email, iii) stripping the attached files and/or disabling the link to the files from the outbound email, and iv) sending a notification to cyber security personnel of an organization regarding the outbound email.

These and other features of the design provided herein can be better understood with reference to the drawings, description, and claims, all of which form the disclosure of this patent application.

DRAWINGS

The drawings refer to some embodiments of the design provided herein in which:

FIG. 1 illustrates a block diagram of an embodiment of an endpoint agent extension of a cyber defense system for email that includes two or more modules.

FIG. 2 illustrates a block diagram of an embodiment of a secure communications module in the endpoint agent extension configured to securely communicate with one or more modules in a cyber security appliance of the cyber defense system located in a network connected to the endpoint computing device in order to receive contextual information outside an email domain about the outbound email under analysis, as well as take instructions or receive additional information from an autonomous response module of the cyber security appliance regarding what autonomous action to take against the outbound email to mitigate a threat posed by the outbound email and its attachments and/or links.

Figure 6:
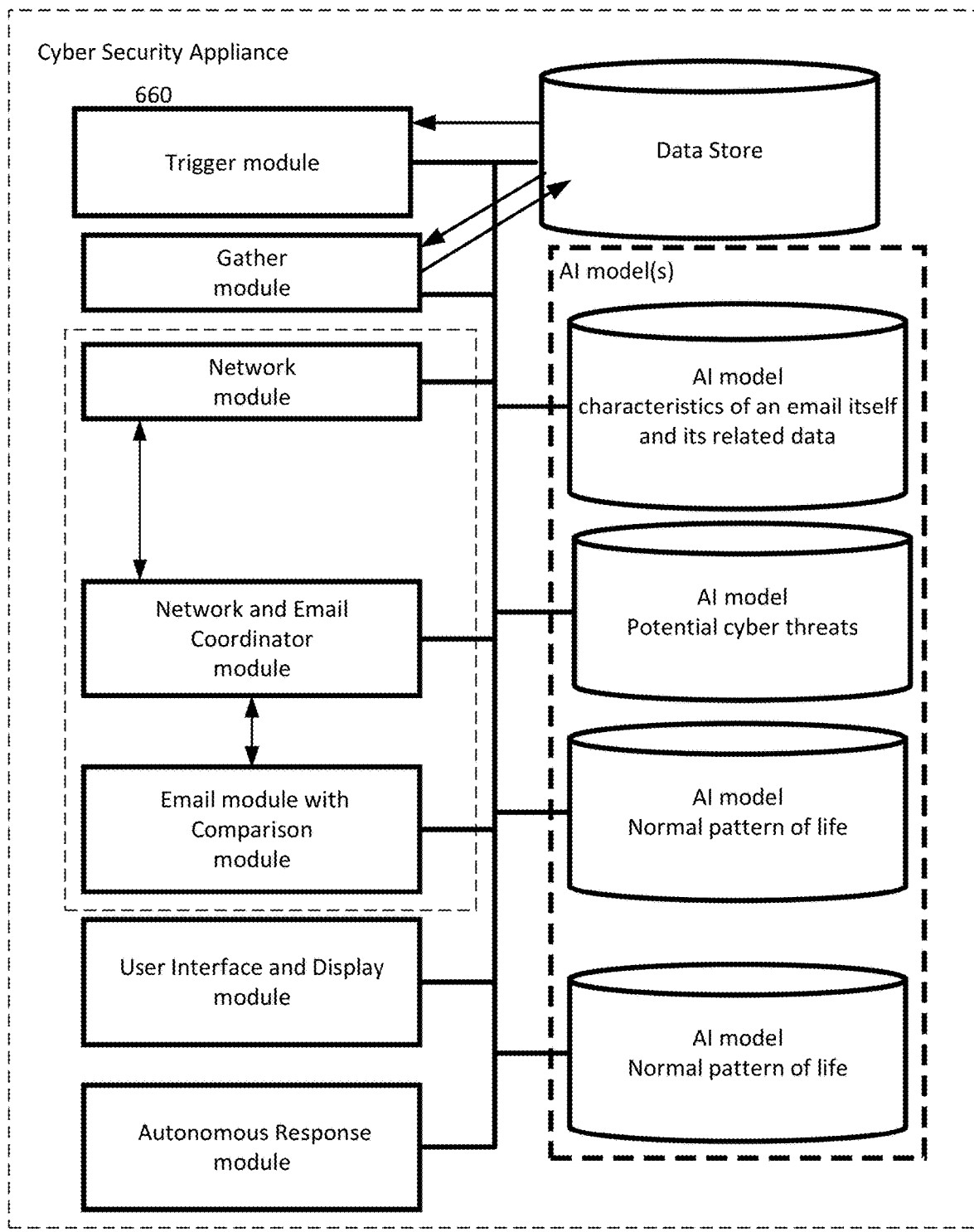

FIG. 6 illustrates a block diagram of an embodiment of a cyber security appliance with an email module that references machine learning models that are trained on the normal behavior of email activity and user activity associated with at least the email system, where the email module determines a threat risk parameter that factors in 'the likelihood that a chain of one or more unusual behaviors of the email activity and user activity under analysis fall outside of derived normal benign behavior;' and thus, are likely malicious behavior.

Figure 7:
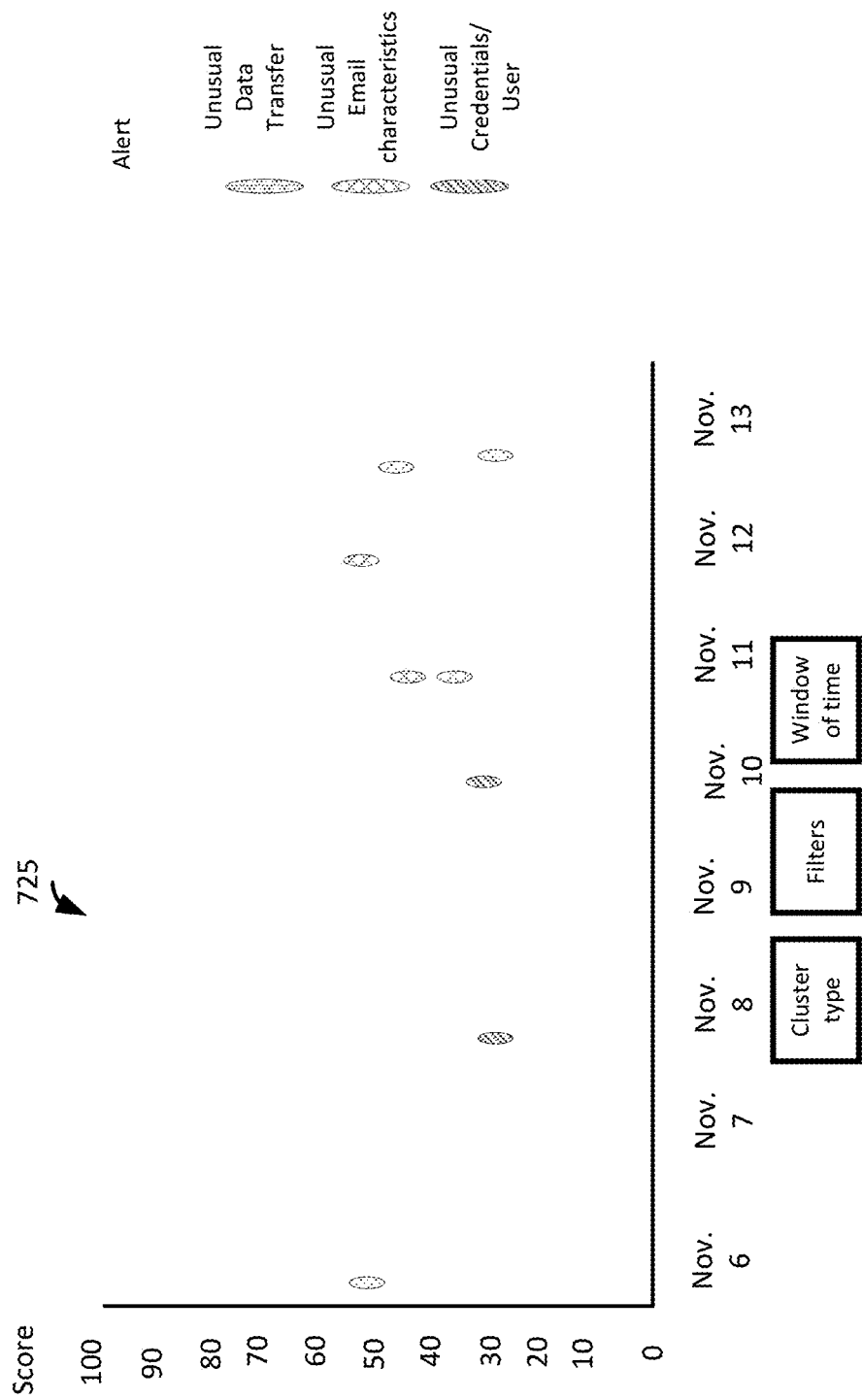

FIG. 7 illustrates a block diagram of an embodiment of the email module comparing the analyzed metrics on the user activity and email activity compared to their respective moving benchmark of parameters that correspond to the normal behavior of email activity and user activity associated with the network and its email domain used by the self-learning machine learning models and the corresponding potential cyber threats.

Figure 8:
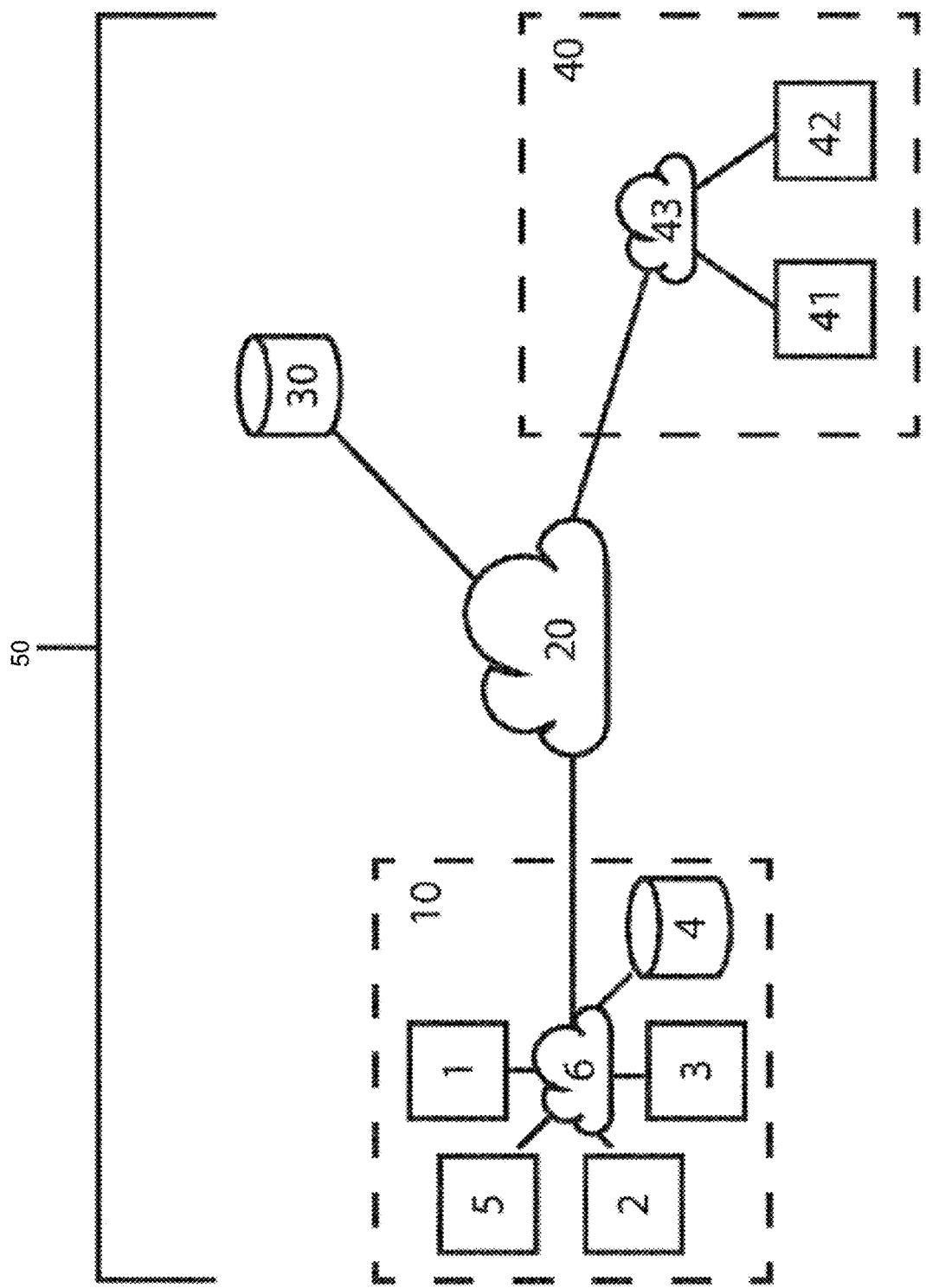

FIG. 8 illustrates a block diagram of an embodiment of an example cyber defense system protecting an example network.

Figure 9:
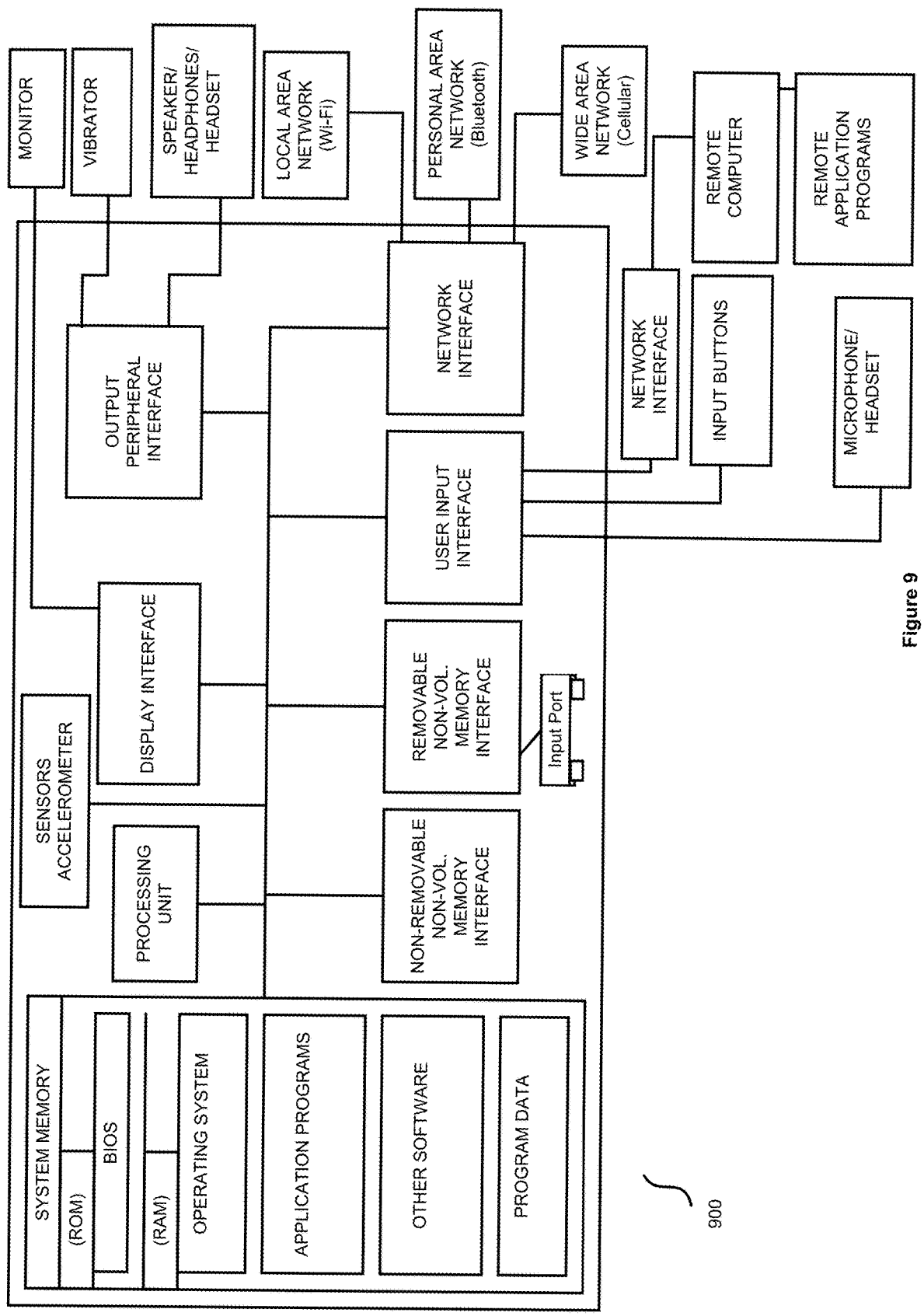

FIG. 9 illustrates a diagram of an example endpoint computing device that can implement an instance of the endpoint agent extension of a cyber defense system for email that includes two or more modules and cooperates with machine learning models.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, Artificial Intelligence analyzes cyber security threats. The cyber defense system can use models that are trained on a normal behavior of email activity and user activity associated with an email system.

The cyber defense system integrates the endpoint agent extension, like a plug-in app, that has email threat detection and autonomous response capabilities for at least outbound emails from, and possibly inbound emails to, the email client application in the endpoint computing device, such as a desktop computing device, mobile computing device, smart home device, etc. The cyber defense system integrates email analysis and autonomous response actions into the endpoint agent extension that interfaces with the email application resident on the endpoint computing device.

Figure 1:
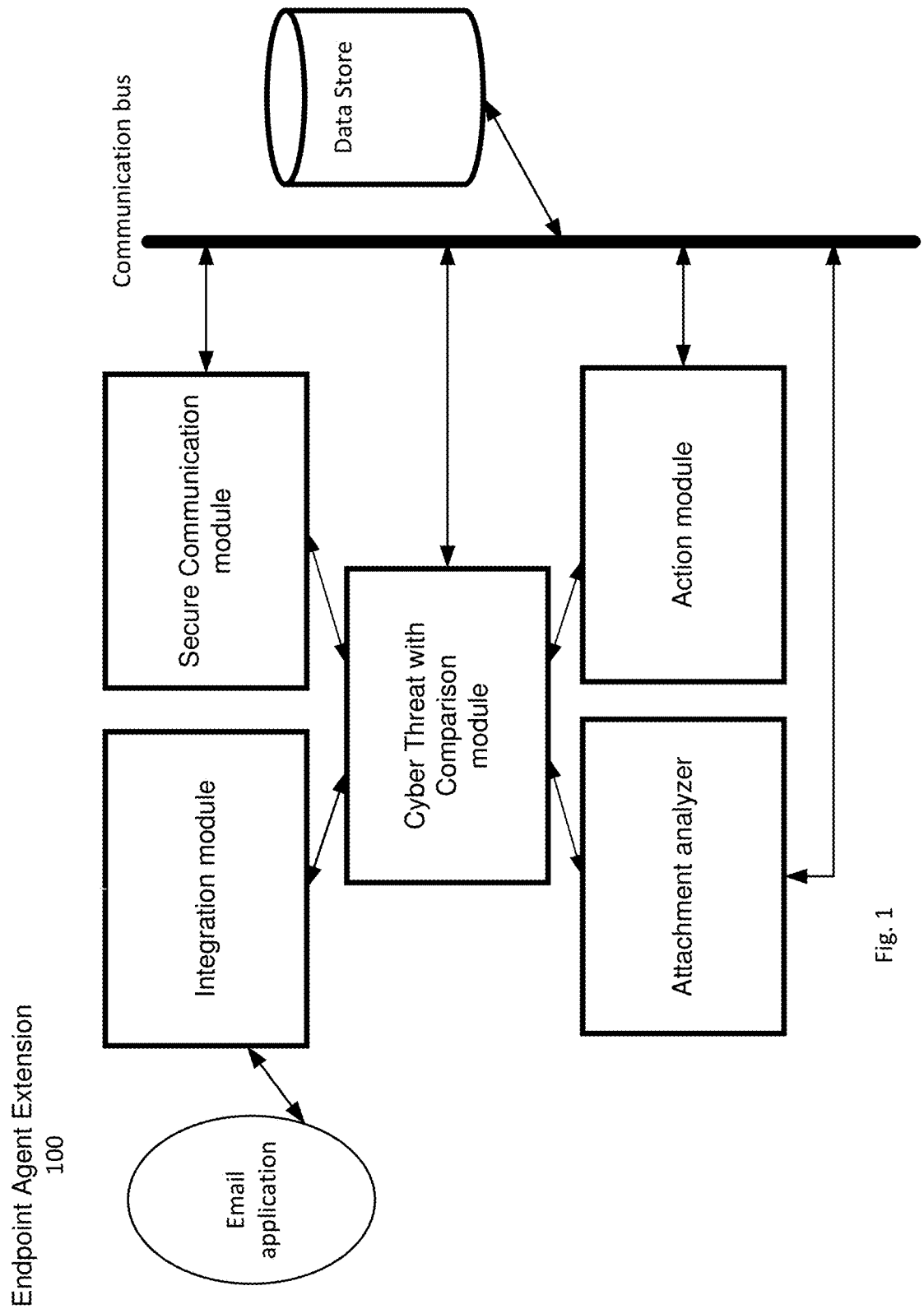

FIG. 1 illustrates a block diagram of an embodiment of an endpoint agent extension of a cyber defense system for email that includes two or more modules.

The endpoint agent extension 100 of a machine-learning cyber defense system for email includes two or more modules. An integration module of the endpoint agent extension 100 integrates with an email client application on an endpoint computing device to detect email cyber threats in emails in the email client application as well as at least regulate outbound emails.

Figure 2:
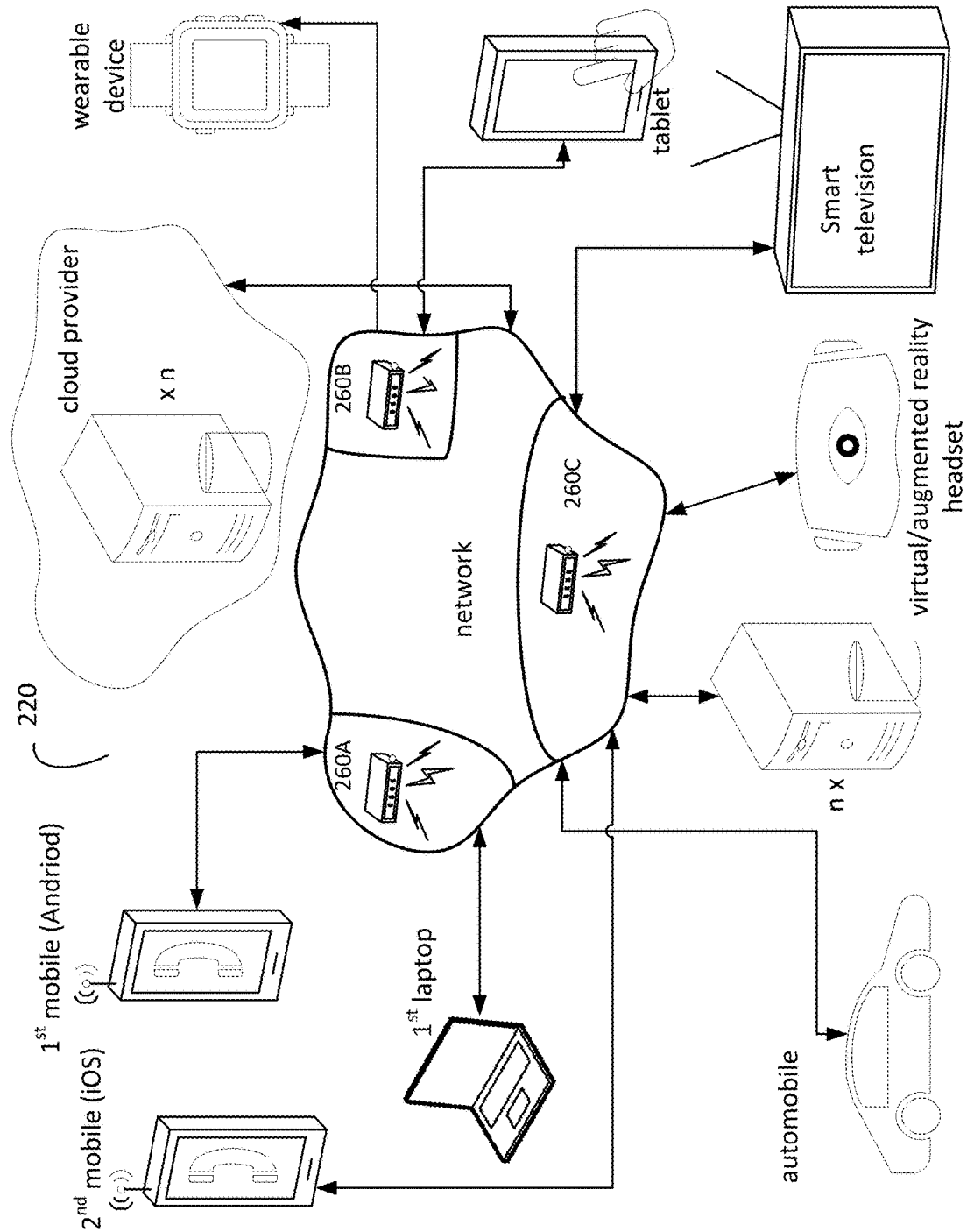

FIG. 2 illustrates a block diagram of an embodiment of a secure communications module in the endpoint agent extension configured to securely communicate with one or more modules in a cyber security appliance of the cyber defense system located in a network connected to the endpoint computing device in order to receive contextual information outside an email domain about the outbound email under analysis, as well as take instructions or receive additional information from an autonomous response module of the cyber security appliance regarding what autonomous action to take against the outbound email to mitigate a threat posed by the outbound email and its attachments and/or links. Thus, the endpoint agent extension of the cyber defense system for email network integrates with an email client application on an endpoint computing device, which includes a desktop computing device, a mobile computing device, tablet, automobile, smart television or other home device, smart watch, smart phone, or other type of endpoint computing device, connected to a network in order to both assist in the creation of and autonomously control the flow of at least outbound email messages and in some embodiments inbound emails as well. The endpoint agent extension in its endpoint computing device securely communicate with one or more modules in a cyber security appliance 260A-260C.

Referring back to FIG. 1, the action module of the endpoint agent extension 100 interfaces with the email client application to direct autonomous actions, by the action module rather than a human taking an action, against at least an outbound email including its attached files and/or linked files under analysis, when a cyber threat module determines the outbound email including its attached files and/or linked files (a) to be a data exfiltration threat, (b) to be both malicious and anomalous behavior as compared to a user's modeled email behavior, and (c) any combination of these two determinations. The autonomous actions, against at least the outbound email and the files, can include one or more actions of i) logging a user off the email client application, ii) preventing the sending of the outbound email, iii) stripping the attached files and/or disabling the link to the files from the outbound email, and iv) sending a notification to cyber security personnel of an organization regarding the outbound email (for example see FIG. 3). The integration module of the endpoint agent extension 100 interfaces with the email client application, such as Microsoft's Outlook email application, Google's Gmail email application, etc., to assist with and regulate the composition and sending of new outbound emails as well as contributing to cyber security on inbound e-mails, such as filling in details on internal distributions of that e-mail from the endpoint computing device, etc. The integration module of the endpoint agent extension 100 of the cyber defense system for email network can have a suite of interfaces, each interface tailored to work that specific email application. The endpoint agent extension 100 can be implemented as one of i) a plug-in integration for a desktop email client application and ii) a browser extension for integration with a browser-based email client application, like Gmail.

Note, when portions of i) the endpoint agent extension 100 and ii) any modules are implemented in software, then their instructions are stored in one or more non-transitory machine readable storage mediums in a format when executed by the endpoint computing device to cause the endpoint computing device to perform operations discussed herein.

The cyber defense system, such as Antigena Email™, interacts with both inbound email and outbound email. An instance of the endpoint agent extension 100 can be resident on each endpoint computing device associated with a network to interface with the email client application resident in that endpoint computing device to perform these actions. Each endpoint agent extension 100 also leverages the knowledge and potentially computing power of a cyber security appliance in a network based box to assist users (See FIG. 2).

Again in FIG. 1, the attachment analyzer of the endpoint agent extension 100 scans any files i) attached to and/or ii) linked to the outbound email that is about to be sent in an outbox, in order to analyze content and meta data of the file, including a type of file, a size of the file, etc., via investigation of the file structure, a meta data analysis tool, and machine learning analysis as well as perform other analysis to gather information about a given file itself and the content in the file. Note, an algorithm configured to investigate various aspects of the file structure indicative of malicious activity can take few cycles to compute than an optical character recognition (OCR) process. Nonetheless, an OCR process can be used in combination with the algorithm when the attachment is sufficiently suspicious to warrant the longer computation time of performing the OCR process.

The attachment analyzer scans, may perform Optical Character Recognition on the content and/or investigation of the file, and performs other analysis to figure out what type of file the attached file or linked file is as well as what subject matter is inside the file attached to or linked to the email.

The secure communications module in the endpoint agent extension 100 securely communicates with one or more modules in a cyber security appliance of the cyber defense system located in a network connected to the endpoint computing device. The modules of the endpoint agent extension 100 receive and factor in, both knowledge outside an email domain as well as metrics and other information from the email domain, collected by the one or more modules of the cyber security appliance located on the network. The modules of the endpoint agent extension 100 also are configured to use the computing power of the one or more modules of the cyber security appliance for one or more of the machine learning models. The endpoint agent extension 100 uses both the external computing power and additional knowledge collected outside the email domain in order to analyze contextual information about the outbound email under analysis, about user behavior of the user generating the outbound email, and/or about a file i) attached to or ii) linked to the outbound email. The endpoint agent extension 100 securely communicates with modules in the cyber defense system, such as an email module, a network module, a SaaS module, etc.

The endpoint agent extension 100 can be an extension of the cyber defense system for email with one or more machine learning models, which has the competitive advantage of including a much larger scope of information when performing an analysis of an email and any files that it has than traditional tools.

Referring back to FIG. 2, the endpoint agent extension resident on the endpoint device also communicates with the deployed modules of the cyber defense system such as the network module, email module, and/or the SaaS module to receive contextual information about user behavior or files and take potential instruction from the autonomous response module of each cyber security appliance 260A-260C in communication with the endpoint agent extension. Therefore, the secure communications module in the endpoint agent extension securely communicates with one or more modules in a cyber security appliance, such as a first cyber security appliance 260A, of the cyber defense system located in a network connected to the endpoint computing device in order to also take instructions or receive additional information from an autonomous response module of the cyber security appliance regarding what autonomous action to take against the outbound email to mitigate a threat posed by the outbound email and its attachments and/or links. A communications module communicates the desired action from the cyber security appliance, such as a first cyber security appliance 260A, to the secure communications module of the endpoint agent extension located on the endpoint computing device, such as a second mobile phone. The endpoint agent extension exchanges secure communications (e.g. insights and commands) with the other cyber-security defense system components. Thus, the endpoint agent extension of the cyber defense system for email network has an interface with an email client application and a secure communications module with a network based cyber security appliance.

The cyber security appliance of the cyber defense system can be located in an IT network, an OT network, a SaaS environment, a cloud network, and/or any combination of these networks, to exchange secure communications with the endpoint agent extension to provide additional contextual information about user behavior outside the email domain, contextual information about attached files to the email under analysis to determine whether the outbound email under analysis and its attachments and/or links either i) are unusual or ii) are not unusual in context of current user behavior, to prevent incidents of data loss as well as wrongly addressed recipients.

Figure 4:
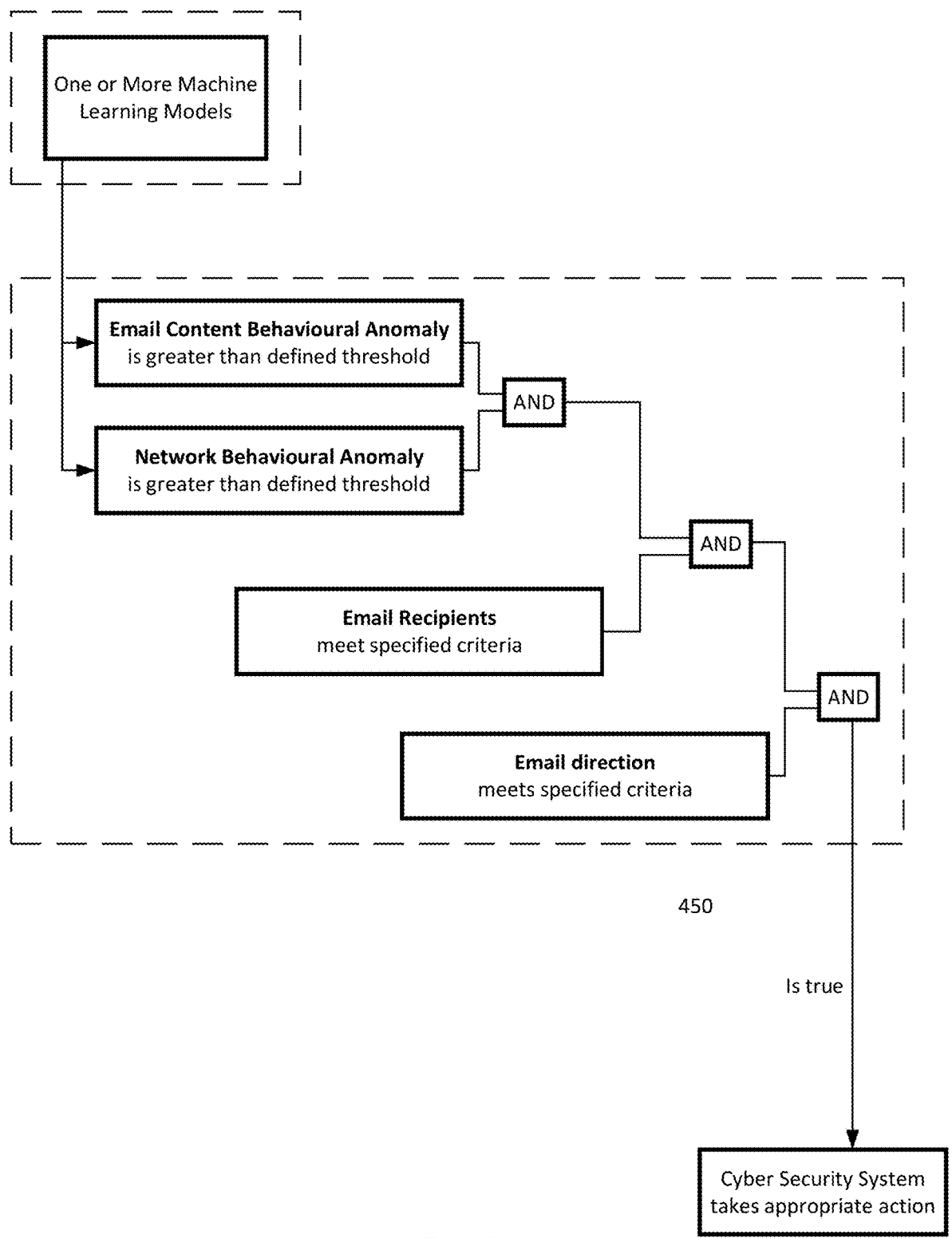
FIG. 4 illustrates a block diagram of an embodiment of an email module and/or cyber threat module factoring in many factors in order to compare the email, based on multiple aspects of the email, in order to determine a threat posed by the outbound email and its attachments and/or links.
Figure 5:
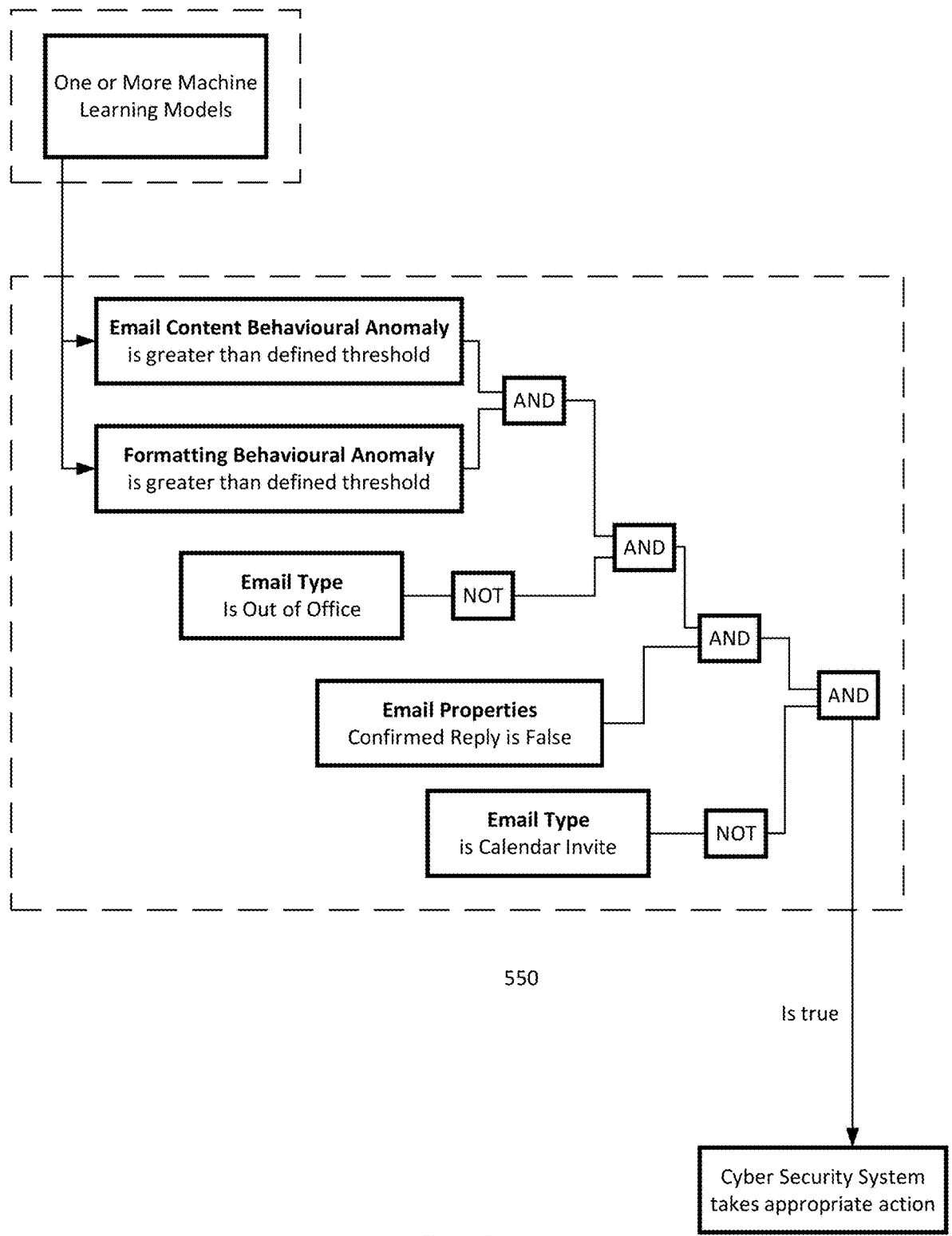
FIG. 5 illustrates a block diagram of an embodiment of an email module and/or cyber threat module factoring in many other example factors in order to compare the email, based on multiple aspects of the email, in order to determine a threat posed by the outbound email and its attachments and/or links.

The endpoint agent extension communicates with other deployed modules of the cyber defense system, such as the network module or the SaaS module, to receive additional contextual information about user behavior, contextual information about attached files, and take potential instructions, such as from the autonomous response element of each module (see e.g. FIG. 4 and FIG. 5). The network module and the SaaS module can provide additional metrics of the user, such as recently viewed various websites which have a logical nexus to the email under analysis, used an on-line service which have a logical nexus to the email under analysis, etc., to help determine how unusual and/or rare that a particular user behavior, email, and/or file is in context of the user's wider behavior analysis factoring in what the user has been doing outside the email domain. The endpoint agent extension allows email security to be treated as part of a wider security landscape of network-cloud-SaaS-email, in order to contextualize information about emails and their attachments from more sources than the email domain. The endpoint agent extension uses the input from other spheres of the extended digital estate such as Cloud/SaaS/Network/Email/Host-based to prevent deeming an a current email under analysis and its attachments i) unusual or ii) not unusual in context of the current user's behavior, and prevent incidents of data loss as well as wrongly addressed recipients.

Referring to FIG. 1, the endpoint agent extension 100 securely communicates with the cyber defense system email module, network module, SaaS module, etc. via several security techniques. The secure communications module can use multiple levels of encryption of at least two or more different types of encryption of the communication. Both the sending and receiving communications modules need to know both types of encryption that are applied as well as an order of encryption and decryption of the types of encryption of the communication (e.g. which encryption is applied first. In addition, the secure communications modules of i) the endpoint agent extension 100, ii) the cyber security appliance, or iii) both of these, will be accompanied by a unique identification token, which also must be verified before allowing any operations on the secure communications (themselves). Note, in addition, the unique identification token may factor in that each user has to log into the e-mail account on a known endpoint computing device that the user is known to use. A token specific to each user can be generated in this fashion. Both sides have an ability to verify the authenticity of that token. The multiple levels of different types of encryption of the communication can include HTTPS, public-private keys, etc.

FIG. 6 illustrates a block diagram of an embodiment of a cyber security appliance with an email module that references machine learning models that are trained on the normal behavior of email activity and user activity associated with at least the email system, where the email module determines a threat risk parameter that factors in 'the likelihood that a chain of one or more unusual behaviors of the email activity and user activity under analysis fall outside of derived normal benign behavior;' and thus, are likely malicious behavior.

The cyber threat module (locally) of the endpoint agent extension and/or email module of the cyber security appliance 660 (in the network) can cooperate with the one or more machine learning models to perform machine learning analysis on all inbound and outbound email flow for an organization to develop an awareness of a pattern-of-life for i) each individual user, ii) the organization as a whole, and iii) clustered groups of users that the machine learning identifies as being closely associated with a given user. The endpoint agent extension and cyber security appliance 660 on the network (e.g. IT network, SaaS, Cloud, etc.) try to 1) derive a pattern-of-life for i) all individual users, ii) the wider organization and iii) smaller clustered peer groups who have close associations with a given user on a per users basis, as well as 2) factor in network metrics (Cloud/Network/SaaS/Host) with email domain metrics to make a decision that the behavior is deviating from the pattern-of-life for the email under analysis and any of its attachments, rather than just block all attachments with macros, or only block those identified by third-party intel as malicious, or those that contain known virus links (e.g. See FIG. 4 and FIG. 5).

In an embodiment, the cyber threat module of the endpoint agent extension performs machine learning analysis, with one or more machine learning models on all inbound and outbound mail flow for an organization to develop an awareness of the pattern-of-life for each individual user, the organization as a whole, and clustered groups of users the machine learning identifies as being closely associated. In an embodiment, i) the endpoint agent extension can host the AI models, ii) the cyber security appliance 660 can host the AI models, and/or iii) a portion of both the endpoint agent extension and the cyber security appliance 660 may each share some portion of the AI models to perform the machine learning analysis.

The cyber defense system, such as Antigena Email™, i) uses mathematical models and/or machine learning models that are trained on a normal email behavioral activity and user activity associated with an email system as well as ii) has an action module (locally) and/or an autonomous response module (over the network), rather than a human taking an action, to cause one or more autonomous rapid actions to be taken to contain the cyber-threat. Both the cyber-threat module and the email module may reference the models that are trained on the normal behavior of email activity and user activity (e.g. see FIG. 7). A determination is made of a threat risk parameter that factors in what is a likelihood of a chain of one or more unusual behaviors of the email activity and user activity under analysis that fall outside of being a normal benign behavior. The action module (locally) and/or an autonomous response module (over the network) are used, rather than a human taking an action, to cause one or more autonomous rapid actions to be taken to contain the cyber-threat when the threat risk parameter from the cyber-threat module is equal to or above an actionable threshold. Some example autonomous actions include logging a user off that client machine, preventing the sending of an email, etc. (see FIG. 3).

The modules of the endpoint agent extension and the modules of the cyber security appliance 660 on the network (e.g. IT network, SaaS, Cloud) cooperate to track and maintain a dynamic profile modeled for each email user in a domain who compose emails. The dynamic profile for a user can be 1) derived from a pattern-of-life for i) that individual user of the email domain, ii) an organization that the individual user of the email domain is a part of, and iii) smaller clustered peer groups who have close associations with a given user on a per users basis, as well as 2) factor in network metrics (Cloud/Network/SaaS/Host) with email domain metrics to make a decision that the behavior is deviating from the pattern-of-life for the email under analysis and any of its files attached or linked rather than just block each and every potentially bad attachment with macros, block all known virus links, and force the user to retrieve or send these emails and their files from a spam folder. The email module in the cyber security appliance 660 is configured to track and maintain the dynamic profile modeled in a user model for each email user in the domain who compose emails, as well as cooperate with a model of email and network activities of each peer group in an organization as well as a model of an organizations email activity in general. Note, the inputs from all three of these different modeled insights is factored into the dynamic profile when making a decision whether the outbound email about to be sent by the user is unusual and triggers a further analysis.

Referring to FIG. 1, the secure communications module in the endpoint agent extension 100 securely receives an instance of a dynamic profile for each email user in the domain who composes emails as well as a memory to store all of those instances of dynamic profiles, one for each user who uses that endpoint computing device, for quicker processing of each outbound mail under analysis. The cyber security appliance may track and maintain 'a dynamic profile modeled in a user model' for each email user in the domain who composes emails, as well as a model of email and network activities of each peer group in an organization, as well as a model of an organization's email activity in general. Inputs from all three of these different modeled insights can be factored in when making a decision whether an email being composed by an individual email user is unusual and should trigger a further analysis.

The cyber threat module on the endpoint agent extension 100 can use the dynamic profile to review each outbound email composed in the email client, on a per user basis, and analyze whether the content, attachment/linked files, and email address recipients are within the pattern-of-life modeled by the multiple machine learning models. Again, the cyber threat module of the endpoint agent extension 100 can receive a 'dynamic profile modeled in a user model' for each email user who composes emails from the cyber security appliance, using its extra computing power and network knowledge. Each individual dynamic profile modeled in a user model may be calculated and maintained on the cyber security appliance, and a dynamic profile will be generated for every email user. The dynamically maintained user profile(s) are sent back down to the endpoint agent extension 100. In each user model, associations are made based on the pattern of life of that user.

In a similar manner, the cyber security appliance and/or the endpoint agent extension 100, depending on computing power available on the endpoint computing device, analyzes a content of an email and its associated files to determine a subject matter of that email and/or file. Note, the user will draft emails on a particular subject to a set of one or more other individual's email addresses. The model will create a cluster, for each particular subject area, of likely recipients of e-mail addresses for a particular subject. Each user can also be clustered with similar users. Likewise, each subject area can also be clustered with similar subject areas. The results of the clustering in the user model will identify rare situations where an email about a particular subject area, typically associated with 'x' recipients, is currently addressed to potentially a wrong e-mail address. In addition, results of the clustering in the user model will also yield rare situations where a malicious cyber threat is occurring shown through the very unusual email behavior by this user. For example, if the email user has never accessed their email account from certain devices but yet now someone is logging into the user's account from the unusual domain or device, and the contents of the email or its attached files or linked files also seem rare/unusual for this user, then the dynamic profile derived from the machine learning models will be used to identify that chain of unusual behavior, which potentially triggers an autonomous action. In another example of detected unusual behavior through use of the dynamic profile for this user, when the user does not typically send out mass spam emails but this current email under analysis has markers which indicate it is likely a mass spam email and the subject matter is rare for this user to email about, then the dynamic profile derived from the machine learning models will be used to identify that chain of unusual behavior potentially triggering an autonomous action.

In an embodiment, the cyber threat module (locally) in the endpoint agent extension 100 or an email module (over the network) in the cyber security appliance can analyze draft emails and outbound emails with a content and metadata analysis tool. Each dynamic profile modeled in a user model contains data about the user, with at least one organization of that data into different types of subject areas. The email module in the cyber security appliance can compute and maintain the dynamic profile modeled in a user model and then send an instance of that dynamic profile modeled in a user model to the endpoint agent extension 100 to aid in the decision making.

In an embodiment, the modules in the endpoint agent extension 100 and/or the modules in the cyber security appliance can use classifiers/machine learning for processing. The mathematical classifiers used to create a 'dynamic profile modeled in a user model' of an individual's email pattern of life (and peer group and organization positioning) that can also be used a) by the cyber security appliance to decide on an action to take on each new email composed and/or b) stored by the endpoint agent extension to make decisions locally on the anomalousness of each new email composed. This also includes existing classifiers that judge anomalousness of attachments, linked files, etc., for emails from that particular email user. Various mathematical algorithms can be used to establish a rarity determination. The modules in the endpoint agent extension 100 use the email classifiers that identify attachment rarity/anomalousness in the email and network domains to establish whether it is actually bad in context. This endpoint agent extension 100 resident on the endpoint computing device cooperates with the e-mail application and uses Artificial Intelligence learning to bolster the email defense on that specific endpoint computing device.

Figure 3:
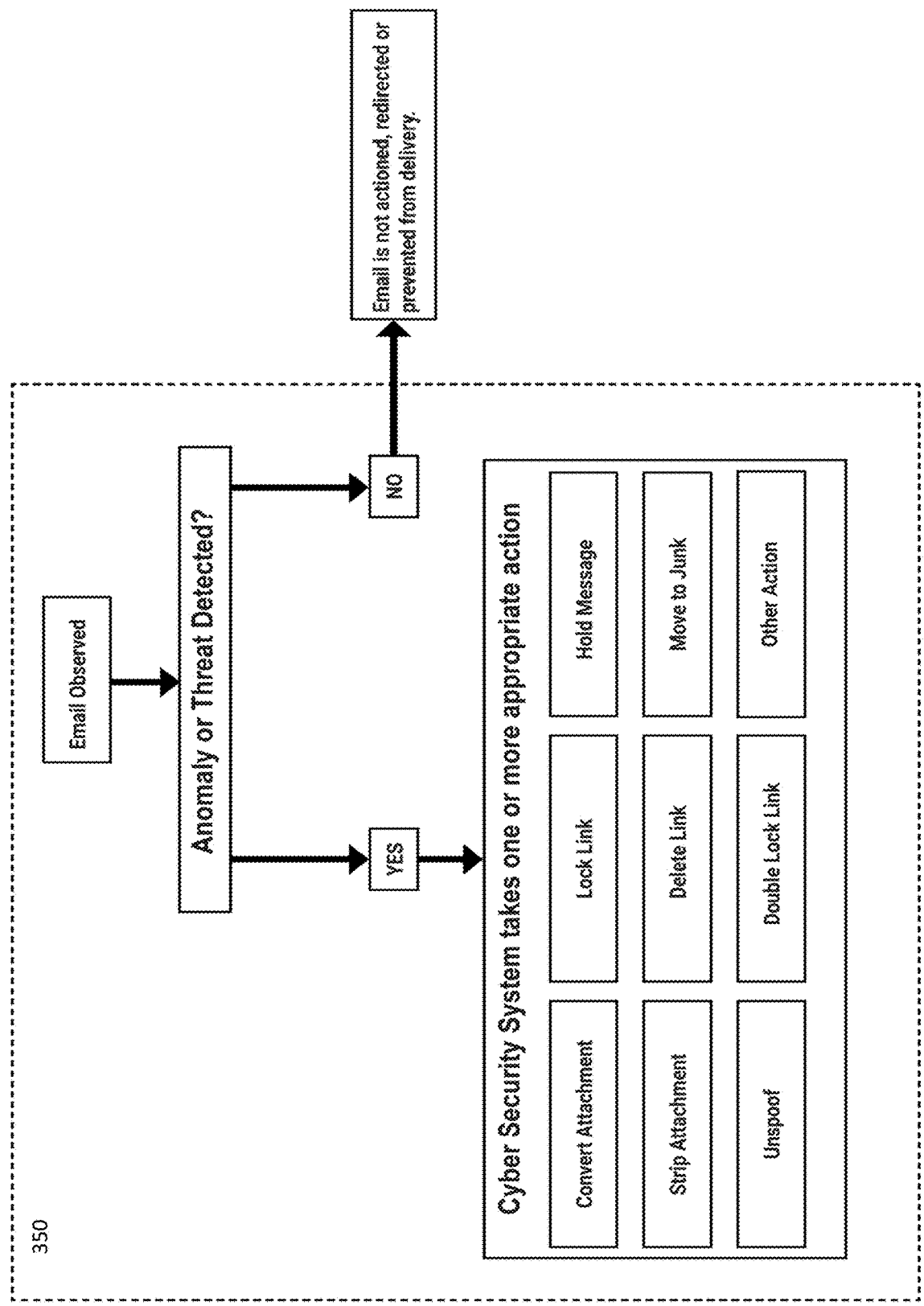
FIG. 3 illustrates a block diagram of an embodiment of example autonomous actions that the autonomous rapid response module and/or action module can be configured to take without a human initiating that action.

The action module of the endpoint agent extension 100 extends the autonomous actions that the email module in cooperation with the autonomous response module in the cyber security appliance can perform to also encompass various actions on outbound emails about to be sent; and therefore, for example, prevent data-loss and enforce compliance policies and procedures (e.g. see FIG. 3).

In addition to directing autonomous actions immediately when detecting the threat to prevent (a) the data exfiltration threat, (b) the malicious and anomalous behavior threat and (c) any combination of these two determinations, the action module of the endpoint agent extension 100 is further configured to direct the autonomous actions against the outbound email when additional determinations are made including (d) preventing the email from being sent and sending a notification to the user on whether they intend to send the outbound email to a deemed errant email recipient address, as well as (e) preventing the email from being sent and sending a notification to the user when the email under analysis including any attached or linked files is determined to violate an email policy implemented by an organization that contains the user.

Note, the autonomous response module and/or action module can be used, rather than a human taking an action, to cause one or more autonomous rapid actions to be taken to contain the cyber-threat for the outbound email under analysis when a threat risk parameter from a cyber-threat module is equal to or above an actionable threshold. The autonomous response module can be configured to direct the action module to perform these actions. The endpoint agent extension 100 extends the autonomous actions that the email module in cooperation with the autonomous response module can perform to also encompass various actions on outbound emails about to be sent; and therefore, for example, prevent data-loss, enforce compliance policies and procedures, etc. (See FIG. 3).

The cyber threat module of the endpoint agent extension 100 is configured to look at/analyze emails being composed to be sent out of an outbox in order to prevent outbound emails (a) deemed anomalous in order to prevent data exfiltration; and thus, prevents unauthorized data-loss using additional input information from other spheres—extended digital estate of Cloud/SaaS/Network/Email/Host; (b) deemed errantly addressed/recipient checking, as an assistive element which applies the knowledge of known correspondents to prevent users from sending to unintended recipients they may have added in error/via typos; and thus, performs recipient checking which is content, context and organization-wide-associations aware; (c) a potentially malicious cyber threat deemed associated with a user's anomalous behavior via working with other cyber defense components, such as autonomous response modules in an IT Network/OT Network/Host/SaaS and Cloud security appliance, Firewalls, etc. to cut off email access for users who are behaving anomalously elsewhere; (d) prevent users from violating internal process/GDPR/policies with their emails; and (e) other similar actions. Thus, the endpoint agent extension 100 with autonomous actions can stop data exfiltration and data loss via sent e-mails, stop emails errantly populated with the wrong/not intended recipients by matching subject matter of email and currently populated recipients, strip attachments, disable links, and many other beneficial uses. The endpoint agent extension 100 prevents damage to business reputation though an unauthorized disclosure and/or a data breach, and/or loss of business revenue through exfiltration of data to competitors and/or other sources drives a need for increased email security. Based on the likelihood that the email composed is anomalous, the endpoint agent extension 100 will take an action on errant or malicious emails as well as importantly will not be instructed to trigger an action on most commonly drafted emails which are not deemed unusual.

The endpoint agent extension 100 plugs-in to the email client application to allow scanning email attachments for content, with similar tools that detect known bad malware, but also makes judgments on whether an attached file or linked file, is otherwise normally benign, but now is malicious in context. This endpoint agent extension 100 uses the email classifiers that identify file attachment or linking rarity/anomalousness in the email and network domains to establish whether the file going with an outbound email is actually bad in context. For example, a file of an excel spreadsheet called 'Leads-16.xslx' is not malicious in itself to an antivirus product if it contains no literal malware. However, an outbound email with this file if sent to an email address identified by the endpoint agent extension as the user's personal email address, or an email address of a competitor's domain, or a known malicious domain, now that outbound e-mail with this file is determined to be a malicious data exfiltration in context.

In another example, as discussed, the endpoint agent extension 100 performs recipient checking which is content, context and organization-wide-associations aware to avoid errantly addressed outbound emails. The endpoint agent extension 100 uses an algorithm to perform basic recipient matches. In addition, the cyber threat module of the agent leverages awareness of the wider network behavior when making local decisions—e.g., this email user has never emailed todd@example.com but this email user has spent a large amount of time interacting with the example.com domain on the network from the information collected by the cyber security appliance in the network, so an email sent to a recipient address in the example.com domain is not an anomalous act.

As discussed, each dynamic profile modeled in a user model contains data about the user, with at least one organization of that data into different types of subject areas. Each dynamic profile modeled in a user model is tailored for that user. Each different type of subject area that this user emails about can have its own associated a grouping of usually possible recipients for that user. Each subject area has its own group of likely recipients, e.g. clustered grouping with links of email recipients to subject area topics. The cyber threat module can analyze a content of an outbound email under analysis, and match the current subject area under analysis to closely related different types of subject areas. The cyber threat module can then analyze whether each of the current email address recipients are likely intended recipients based on that particular subject area and its own associated grouping of usually possible recipients for that user. If the current recipient is not in the cluster of likely recipients for the one or more subject areas of that email being composed, then the cyber threat module can notify the user of the possible wrongly listed email recipient. The user can correct the email with the proposed recipient or confirm the current listed recipient. Each subject area is dynamically updated based on the history of the user, which is continually updated as the user continues to compose and send emails.

The cyber threat module cooperates with and sends regular updates to maintain one or more policy based machine learning models. The cyber threat module cooperates with and sends regular updates to a user model modeled on General Data Protection Regulation (GDPR) compliance to analyze for potential violations. In an embodiment, the cyber defense system analysis and collection of data complies with GDPR. Generally, the cyber defense system collects data in a manner that keeps an individual's actual identity anonymous but with identifiers to cluster information on each user, on a per user basis. Alternatively, data collection from the network and the email domain is not anonymized. An optional anonymization layer for the network component can be implemented to interfere with that data visual appearance, it does not affect the underlying data collection or storage and is not anonymized to administrator users. In addition, the data communication between the agent and the main appliance is encrypted. The one or more models trained on policy can assist in detecting policy violations like a user trying to access their personal email address at work or listing personal credit card information in an email. The one or more models can identify policy violations including GDPR violations.

Traditionally, some previous systems merely look at emails going into an inbox. This endpoint agent extension can look at/analyze emails coming into an inbox as well as e-mails being composed to be sent out of an outbox. The endpoint agent extension with this autonomous action can stop data exfiltration and data loss via sent e-mails, stop emails errantly populated with the wrong/not intended recipients by matching subject matter of email and currently populated recipients, and many other beneficial uses. Again, the cyber defense system is configured to integrate the endpoint agent extension that has email threat detection and response capabilities into the endpoint computing device.

FIG. 3 illustrates a block diagram of an embodiment of example autonomous actions that the autonomous rapid response module and/or action module can be configured to take without a human initiating that action.

The autonomous rapid response module is configurable, via the user interface 350, to know when it should take the autonomous actions to contain the cyber-threat when i) a known malicious email or ii) at least highly likely malicious email is determined by the email module. The autonomous rapid response module has an administrative tool, configurable through the user interface, to program/set what autonomous actions the autonomous rapid response module can take, including types of actions and specific actions the autonomous rapid response module is capable of, when the email module indicates the threat risk parameter is equal to or above the actionable threshold, selectable by the cyber professional, that the one or more emails under analysis are at least highly likely to be malicious.

The types of actions and specific actions the autonomous rapid response module customizable for different users and parts of the system; and thus, configurable for the cyber professional to approve/set for the autonomous rapid response module to automatically take those actions and when to automatically take those actions.

The autonomous rapid response module has a library of response actions types of actions and specific actions the autonomous rapid response module is capable of, including focused response actions selectable through the user interface 350 that are contextualized to autonomously act on specific email elements of a malicious email, rather than a blanket quarantine or block approach on that email, to avoid business disruption to a particular user of the email system. The autonomous rapid response module is able to take measured, varied actions towards those email communications to minimize business disruption in a reactive, contextualized manner.

The autonomous response module works hand-in-hand with the AI models to neutralize malicious emails, and deliver preemptive protection against targeted, email-borne attack campaigns in real time.

The email module cooperating with the autonomous response module can detect and contain, for example, an infection in the network, recognize that the infection had an email as its source, and identify and neutralize that malicious email by either removing that from the corporate email account inboxes, or simply stripping the malicious portion of that before the email reaches its intended user. The autonomous actions range from flattening attachments or stripping suspect links, through to holding emails back entirely if they pose a sufficient risk.

The email module can identify the source of the compromise and then invoke an autonomous response action by sending a request to the autonomous response model. This autonomous response action will rapidly stop the spread of an emerging attack campaign, and give human responders the crucial time needed to catch up.

Example Possible Actions

The following selection of example actions, categorized into delivery actions, attachment actions, link actions, header and body actions, etc., appear on the dashboard and can be taken by or at least suggested to be taken by the autonomous response module when the threat risk parameter is equal to or above a configurable set point set by a cyber security professional:

Hold Message: The autonomous response module has held the message before delivery due to suspicious content or attachments. Held emails can be reprocessed and released by an operator after investigation. The email will be prevented from delivery, or if delivery has already been performed, removed from the recipient's inbox. The original mail will be maintained in a buffered cache by the data store and can be recovered, or sent to an alternative mailbox, using the 'release' button in the user interface 350.

Lock Links: The autonomous response module replaces the URL of a link such that a click of that link will first divert the user via an alternative destination. The alternative destination may optionally request confirmation from the user before proceeding. The original link destination and original source will be subject to additional checks before the user is permitted to access the source.

Double Lock Links: The autonomous response module replaces the URL with a redirected Email link. If the link is clicked, the user will be presented with a notification to that user that they are not permitted to access the original destination of the link. The user will be unable to follow the link to the original source, but their intent to follow the link will be recorded by the data store via the autonomous response module.

Strip Attachments: The autonomous response module strips one or more attachments of this email. Most file formats are delivered as converted attachments; file formats which do not convert to visible documents (e.g. executables, compressed types) are stripped to reduce risk. The 'strip attachment' action will cause the system to remove the attachment from the email, and replace it with a file informing the user that the original attachment was removed.

Redirect: The autonomous response module will ensure the email is not delivered to the intended recipient but is instead diverted to a specified email address.

Take no action on attachments: Can be set on a particular user basis. This action will override any attachment actions that would be otherwise taken by the autonomous response module whether in response to a particular threat alert or overall detected anomaly level.

Unspoof: The autonomous response module will identify standard email header address fields (e.g. rfc822 type) and replace the Personal Name and the header email address with an alternative name or email address which might reveal more about the true sender of the email. This mechanism significantly reduces the psychological impact of spoof attempts.

Referring to FIG. 1, the action module that is used, rather than a human taking an action, to cause one or more autonomous rapid actions to be taken to contain the cyber-threat when the threat risk parameter from the cyber-threat module is equal to or above an actionable threshold. The actions include logging a user off that client machine, preventing the sending of an email, sending a notification to the organization's cyber security personnel, sending a notification to the user on whether they intend to send this email to possibly an errant email recipient address, etc. Based on the likelihood that the email composed is anomalous, the endpoint agent extension 100 may (or may be instructed to) suggest alternative recipients based on known correspondence history or other contextual factors, to strip attachments or prevent the outbound email entirely.

As an endpoint agent extension 100 of the cyber defense system that prevents malicious inbound emails, this application can regulate at least outbound emails. For outbound emails endpoint agent extension performs the following actions:

(a) Prevent data exfiltration/prevention of data loss—normally caused primarily through users emailing out sensitive attachments to their own personal email address, to competitor's email address, or to an unintended recipient's email address. The endpoint agent extension 100 prevents many things such as damage to business reputation though an unauthorized disclosure and/or a data breach, and/or loss of business revenue through exfiltration of data to competitors, etc. The dynamic profile and machine learning models help determine how unusual/rare the file with that subject matter and with that type of document file type is attached to or linked to this user's emails. The exchanges of secure communications between the cyber security appliance and the endpoint agent extension 100 can give context of recent and historical network activities to assist in determining whether the transfer of this file is unusual in this context and to the listed email recipients. In an embodiment, some factors are looked at to trigger the exfiltration analysis. For example, sometimes the attached file or linked file must be over a specific data file size. If the file is below this data file size, depending on the subject matter and current context, the amount of data loss of non-highly sensitive data would be minimal so then that will not trigger the exfiltration analysis. Also, for example, when the attached file or linked to file is a specific subject matter or type of document that is unusual for the user to attach to or link to their emails, then that can trigger the exfiltration analysis. If the email with the file attached or linked is addressed with a recipient's personal email address and/or a competitor's email address and/or a known or suspect bad email address of a malicious email domain, then that can trigger the exfiltration analysis.

(b) Recipient checking/deemed errantly addressed emails—The outbound email threat module performs recipient checking which is content, context and organization-wide-associations aware. The endpoint agent extension 100 can perform basic recipient matches as a baseline (fuzzy matches like todd@example.com vs ted@sample.com), but also then analyze the wider associations of users, content etc. to make more nuanced suggestions. The cyber threat module uses email pattern-of-life knowledge from the models to make smart suggestions—e.g., you may have previously communicated with todd@example.com but never about subject A, so you may intend to email ted@sample.com with whom you regularly discuss subject A. The cyber threat module of the endpoint agent extension 100 leverages awareness of the wider network behavior when making local decisions—e.g., you have never emailed todd@example.com but you have spent a large amount of time interacting with example.com domain on the network, so it is not an anomalous or unusual recipient address.

(c) The email user's current behavior is deemed anomalous/unusual with a user's modeled behavior via working with other cyber defense components including the one or more machine learning models.

The cyber threat module spots anomalous/unusual behavior to limit damage when a breach occurs elsewhere—such as when a worker reuses credentials that are compromised (on a third-party platform) and their corporate mail account is accessed to send spam emails.

As discussed, each dynamic profile modeled in a user model contains data about that user, with at least one organization of that data into different types of subject areas. The endpoint agent extension uses classifiers to see when attachments are potentially malicious i) in context of the current email and its listed recipients as well as ii) the current user's function in the organization and past history of this user and peers doing a similar function/job within the organization as well as iii) incorporating information for files, this user, and emails from outside the email domain. Thus, this agent can use contextual information from the other sources like host, SaaS and network to inform decisions. For example, the SaaS module may spot a user downloading files from an unusual location for their clustered user group, or unusually large files. The cyber defense system can then perform multi-layered autonomous response: the SaaS module logs the user out, the network module enforces standard pattern-of-life behavior over a user's normal browsing port, e.g. port 443/80, and the endpoint agent extension prevents anomalous outbound emails or those containing the file(s) in question. Multiple layers each take actions at approximately the same time to prevent the cyber threat. Note, in an embodiment, the cyber defense system can use different types of classification algorithms in Machine Learning such as: Linear Classifiers, Logistic Regression Classifiers, Naive Bayes Classifiers, Nearest Neighbor Classifiers, and Support Vector Machines Classifiers. An unsupervised classification may use algorithms that try to discover natural structure in data. Note, this natural structure might not be exactly what humans think of as logical division. The algorithms look for similar patterns and structures in the data points and groups them into clusters. The classification of the data is done based on the clusters formed. The unsupervised classification can generate insights, such as associations, commonness, rarity, etc., from the data.

(d) The cyber threat module cooperates with one or more models trained on policy including a model trained on GDPR to protect the personal data and privacy of citizens. Thus, the outbound cyber threat module cooperating with the GDPR model will analyze emails in order to look for identifying personal data or missing the required unsubscribe links mandated by the legislation.

Thus, the cyber defense system for email that includes two or more modules and one or more machine learning models prevents at least outbound emails that this cyber defense system deems bad or errant, as points (a) to (e) herein.

Next, the endpoint agent extension is made easy to roll-out. A suite of executable files in a rollout routine facilitate and automate a download and installation of the endpoint agent extension on the endpoint computing device. The rollout routine is structured to be compliant with a Microsoft one click standard. Likewise, on a phone, the endpoint agent extension is made to match a profile on the phone Mobile Device Management.

Again, FIG. 6 illustrates a block diagram of an embodiment of a cyber security appliance with an email module that references machine learning models that are trained on the normal behavior of email activity and user activity associated with at least the email system.

The cyber security appliance 660 may protect against cyber security threats from an e-mail system as well as its network. The cyber security appliance 660 may include components such as i) a trigger module, ii) a gather module, iii) a data store, iv) a network module, v) an email module, vi) a network & email coordinator module, vii) a user interface and display module, viii) an autonomous response module, ix) one or more machine learning models including a first Artificial Intelligence model trained on characteristics of an email itself and its related data, a second Artificial Intelligence model trained on potential cyber threats, and one or more Artificial Intelligence models each trained on different users, devices, system activities and interactions between entities in the system, and other aspects of the system, as well as x) other similar components in the cyber security appliance 660.

A trigger module may detect time stamped data indicating one or more i) events and/or ii) alerts from I) unusual or II) suspicious behavior/activity are occurring and then triggers that something unusual is happening. Accordingly, the gatherer module is triggered by specific events and/or alerts of i) an abnormal behavior, ii) a suspicious activity, and iii) any combination of both. The inline data may be gathered on the deployment from a data store when the traffic is observed. The scope and wide variation of data available in this location results in good quality data for analysis. The collected data is passed to the email module.

The gatherer module may consist of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gatherer module for each possible hypothesis. A feedback loop of cooperation occurs between the gatherer module, the email module monitoring email activity, the network module monitoring network activity, the mass email association algorithm, the email similarity scoring algorithm, the email layout change predictor algorithm, the image-tracking link module, and the email module to apply one or more models trained on different aspects of this process. Each hypothesis of typical threats, e.g. human user insider attack/inappropriate network and/or email behavior, malicious software/malware attack/inappropriate network and/or email behavior, can have various supporting points of data and other metrics associated with that possible threat, and a machine learning algorithm will look at the relevant points of data to support or refute that particular hypothesis of what the suspicious activity and/or abnormal behavior related for each hypothesis on what the suspicious activity and/or abnormal behavior relates to. Networks have a wealth of data and metrics that can be collected and then the mass of data is filtered/condensed down into the important features/salient features of data by the gatherers.

In an embodiment, the network module, the email module, and the network & email coordinator module may be portions of the email module. In an embodiment, the mass email association algorithm, the email similarity scoring algorithm, the email layout change predictor algorithm, the image-tracking link module also may be separate modules or combined into portions of a larger module. A module may be implemented as an electronic hardware circuit, an executable software structure, and/or a combination of both.

The email module may also use one or more machine learning models trained on cyber threats in the email system. The email module may reference the models that are trained on the normal behavior of email activity and user activity associated with the email system. The email module can reference these various trained machine learning models and data from the network module, the email and network coordinator module, and the trigger module. The email module can determine a threat risk parameter that factors in how the chain of unusual behaviors correlate to potential cyber threats and 'what is a likelihood of this chain of one or more unusual behaviors of the email activity and user activity under analysis that fall outside of derived normal benign behavior;' and thus, is malicious behavior. Each of the other modules, such as the mass email association algorithm, the email similarity scoring algorithm, the email layout change predictor algorithm, the image-tracking link module can supply its own input to the overall analysis by the email module.

The one or more machine learning models can be self-learning models using unsupervised learning and trained on a normal behavior of different aspects of the system, for example, email activity and user activity associated with an email system. The self-learning models of normal behavior are regularly updated. The self-learning model of normal behavior is updated when new input data is received that is deemed within the limits of normal behavior. A normal behavior threshold is used by the model as a moving benchmark of parameters that correspond to a normal pattern of life for the endpoint computing device. The normal behavior threshold is varied according to the updated changes in the computer system allowing the model to spot behavior on the endpoint computing device that falls outside the parameters set by the moving benchmark.

FIG. 7 illustrates a block diagram of an embodiment of the email module comparing the analyzed metrics on the user activity and email activity compared to their respective moving benchmark of parameters that correspond to the normal behavior of email activity and user activity associated with the network and its email domain used by the self-learning machine learning models and the corresponding potential cyber threats. The email module can then determine, in accordance with the analyzed metrics and the moving benchmark of what is considered normal behavior, a cyber-threat risk parameter indicative of a likelihood of a cyber-threat.

The cyber security appliance may also include one or more machine learning models trained on gaining an understanding of a plurality of characteristics on an email itself and its related data including classifying the properties of the email and its metadata.

The email module can also reference the machine learning models trained on an email itself and its related data to determine if an email or a set of emails under analysis have potentially malicious characteristics. The email module can also factor this email characteristics analysis into its determination of the threat risk parameter.

Referring to FIG. 6, the network module may have one or more machine learning models trained on a normal behavior of users, devices, and interactions between them, on a network, which is tied to the email system. The email module can also factor this network analysis into its determination of the threat risk parameter.

A user interface has one or more windows to display network data and one or more windows to display emails and cyber security details about those emails through the same user interface on a display screen, which allows a cyber professional to pivot between network data and email cyber security details within one platform, and consider them as an interconnected whole rather than separate realms on the same display screen.

The cyber security appliance 660 may use at least three separate machine learning models. Each machine learning model may be trained on specific aspects of the normal pattern of life for the system such as devices, users, network traffic flow, outputs from one or more cyber security analysis tools analyzing the system, etc. One or more machine learning models may also be trained on characteristics and aspects of all manner of types of cyber threats. One or more machine learning models may also be trained on characteristics of emails themselves.

The email module monitoring email activity and the network module monitoring network activity may both feed their data to a network & email coordinator module to correlate causal links between these activities to supply this input into the email module. The email module can also factor this network activity link to a particular email causal link analysis into its determination of the threat risk parameter.

The mass email association algorithm determines a likelihood that two or more highly similar emails that are being i) sent from or ii) received by a collection of users in the email domain under analysis in the substantially simultaneous time period, based on at least i) historical patterns of communication between those users, and ii) how rare the collection of users under analysis all would send and/or receive this highly similar email in roughly the substantially simultaneous time frame. The normal behavior of email activity and user activity associated with the network and its email domain can be used by the mass email association algorithm to create a map of associations between users in the email domain to generate the probabilistic likelihood that the two or more users would be included in the highly similar emails determined by the mass email association detector.

The email layout change predictor algorithm analyzes changes in an email layout of an email of a user in that email domain to assess whether malicious activity is occurring to an email account of that user, based on the changes in the email layout of the email deviating from a historical norm. The email layout change predictor algorithm detects anomaly deviations by considering two or more parameters of an email selected from group consisting of a layout of the email, a formatting of the email, a structure of an email body including any of content, language-usage, subjects, and sentence construction within the email body in order to detect a change in behavior of the email sender under analysis that is indicative of their account being compromised. The email layout change predictor algorithm utilizes the machine learning models. One or more machine learning models are trained and configured to model and store the historical norm state of the layout, including the formatting and the structure for each sender (internal or external to the email domain). The email layout change predictor algorithm compares this historical norm state of the layout, the formatting, and structure every time a new email is seen. The email layout change predictor algorithm checks whether the new email about to be sent diverges more than a threshold amount from the historical norm state.

An image-tracking link detector detects an image-tracking link based on visual properties of the link (e.g. Cascading Stylesheets (CSS) properties that describe the link's visual style and appearance) as well as a purpose of any query parameters from that link. The image-tracking link module cooperates with the image-tracking link detector to analyze the link's properties that describe the link's visual style and appearance accompanying the link to detect whether the tracking link is intentionally being hidden as well as a type of query requests made by the tracking link. With this information, the image-tracking link module determines if this tracking link is a suspicious covert tracking link and then the autonomous response module takes an autonomous action to remedy the tracking link when determined to be the suspicious covert tracking link while not stopping every email entering the email domain with a tracking link but merely emails with the suspicious covert tracking link.

Again, the email module is configured to receive an input from at least each of the two or more modules above. The email module factors in the input from each of these analyses above to use a wide range of metadata from observed email communications to detect and determine when the deviation from the normal behavior of email activity and user activity associated with the network and its email domain is occurring, and then determine what autonomous action to take to remedy against a potentially malicious email. The modules communicate with the set of machine learning models. The two or more modules also are configured to receive information from the probes, including a set of detectors, to provide at least a wide range of metadata from observed email communications in the email domain. The email module cooperates with the two or more modules to analyze the wide range of metadata from the observed email communications. The email module also analyzes with the machine learning models trained on the normal behavior of email activity and user activity associated with the network and its email domain in order to determine when a deviation from the normal behavior of email activity and user activity associated with the network and its email domain is occurring.

The cyber security appliance 660 uses various probes to collect the user activity and the email activity and then feed that activity to the data store and as needed to the email module and the machine learning models. The email module uses the collected data to draw an understanding of the email activity and user activity in the email system as well as updates a training for the one or more machine learning models trained on this email system and its users. For example, email traffic can be collected by putting probe hooks into the e-mail application, such as Outlook or Gmail, and/or monitoring the internet gateway from which the e-mails are routed through. Additionally, probes may collect network data and metrics via one of the following methods: port spanning the organizations existing network equipment; inserting or re-using an in-line network tap, and/or accessing any existing repositories of network data.

The email module detects deviations from a normal behavior of email activity and user activity associated with the network and its email domain based on at least one or more AI models determining normal behavior of email activity and user activity associated with the network and its email domain; rather than, ahead of time finding out what a 'bad' email signature looks like and then preventing that known bad' email signature.

The cyber security appliance 660 takes actions to counter detected potential cyber threats. The autonomous response module, rather than a human taking an action, can be configured to cause one or more rapid autonomous actions to be taken to contain the cyber-threat when the threat risk parameter from the email module is equal to or above an actionable threshold. The email module cooperates with the autonomous response module to cause one or more autonomous actions to be taken to contain the cyber threat, in order to improve computing devices in the email system by limiting an impact of the cyber-threat from consuming unauthorized CPU cycles, memory space, and power consumption in the computing devices via responding to the cyber-threat without waiting for some human intervention.

The network module and its machine learning models are utilized to determine potentially unusual network activity in order to provide an additional input of information into the email module in order to determine the threat risk parameter (e.g. a score or probability) indicative of the level of threat. A particular user's network activity can be tied to their email activity because the network module observes network activity and the network & email coordinator module receives the network module observations to draw that into an understanding of this particular user's email activity to make an appraisal of potential email threats with a resulting threat risk parameter tailored for different users in the e-mail system. The network module tracks each user's network activity and interconnects the network activity and email activity to closely inform one-another's behavior and appraisal of potential email threats.

The cyber defense system 660 can now track possible malicious activity observed by the network module on an organization's network back to a specific email event observed by the e-mail module, and use the autonomous rapid response module to shut down any potentially harmful activity on the network itself, and also freeze any similar email activity triggering the harmful activity on the network.

As discussed, the probes, including the set of detectors, collect the user activity as well as the email activity. The collected activity is supplied to the data store for storage of this information and subsequently evaluated for unusual or suspicious behavioral activity, e.g. alerts, events, etc., by the modules. The collected data can also be used to potentially update the training for the one or more machine learning models trained on the normal pattern of life of user activity and email activity for this email system, its users and the network and its entities.

In FIG. 7, the user interface can display a graph 725 of an example chain of unusual behavior for the email(s) in connection with the rest of the network under analysis.

The network & email module can tie the alerts and events from the email realm to the alerts and events from the network realm.

The email module cooperates with one or more machine learning models. The one or more machine learning models are trained and otherwise configured with mathematical algorithms to infer, for the cyber-threat analysis, 'what is possibly happening with the chain of distinct alerts and/or events, which came from the unusual pattern,' and then assign a threat risk associated with that distinct item of the chain of alerts and/or events forming the unusual pattern.

This is 'a behavioral pattern analysis' of what are the unusual behaviors of the network/system/device/user/email under analysis by the email module and the machine learning models. The cyber defense system uses unusual behavior deviating from the normal behavior and then builds a chain of unusual behavior and the causal links between the chains of unusual behavior to detect cyber threats. An example behavioral pattern analysis of what are the unusual behaviors may be as follows. The unusual pattern may be determined by filtering out what activities/events/alerts that fall within the window of what is the normal pattern of life for that network/system/device/user/email under analysis, and then the pattern of the behavior of the activities/events/alerts that are left, after the filtering, can be analyzed to determine whether that pattern is indicative of a behavior of a malicious actor—human, program, email, or other threat. The defense system can go back and pull in some of the filtered out normal activities to help support or refute a possible hypothesis of whether that pattern is indicative of a behavior of a malicious actor. An example behavioral pattern included in the chain is shown in the graph over a time frame of, an example, 7 days. The defense system detects a chain of anomalous behavior of unusual data transfers three times, unusual characteristics in emails in the monitored system three times which seem to have some causal link to the unusual data transfers. Likewise, twice unusual credentials attempted the unusual behavior of trying to gain access to sensitive areas or malicious IP addresses and the user associated with the unusual credentials trying unusual behavior has a causal link to at least one of those three emails with unusual characteristics. When the behavioral pattern analysis of any individual behavior or of the chain as a group is believed to be indicative of a malicious threat, then a score of how confident is the defense system in this assessment of identifying whether the unusual pattern was caused by a malicious actor is created. Next, also assigned is a threat level parameter (e.g. score or probability) indicative of what level of threat does this malicious actor pose to the system. Lastly, the cyber defense system is configurable in its user interface of the defense system on what type of automatic response actions, if any, the defense system may take when different types of cyber threats that are equal to or above a configurable level of threat posed by this malicious actor.

The email module may chain the individual alerts and events that form the unusual pattern into a distinct item for cyber-threat analysis of that chain of distinct alerts and/or events. The email module may reference the one or more machine learning models trained on e-mail threats to identify similar characteristics from the individual alerts and/or events forming the distinct item made up of the chain of alerts and/or events forming the unusual pattern.

One or more machine learning models may also be trained on characteristics and aspects of all manner of types of cyber threats to analyze the threat risk associated with the chain/cluster of alerts and/or events forming the unusual pattern. The machine learning technology, using advanced mathematics, can detect previously unidentified threats, without rules, and automatically defend networks.

The models may perform by the threat detection through a probabilistic change in normal behavior through the application of an unsupervised Bayesian mathematical model to detect behavioral change in computers and computer networks. The core cyber defense system is termed the 'Bayesian probabilistic'. The Bayesian probabilistic approach can determine periodicity in multiple time series data and identify changes across single and multiple time series data for the purpose of anomalous behavior detection. From the email and network raw sources of data, a large number of metrics can be derived each producing time series data for the given metric.

The detectors in the email module including its network module and email module components can be discrete mathematical models that implement a specific mathematical method against different sets of variables with the target. Thus, each model is specifically targeted on the pattern of life of alerts and/or events coming from, for example, i) that cyber security analysis tool, ii) analyzing various aspects of the emails, iii) coming from specific devices and/or users within a system, etc.

At its core, the cyber defense system mathematically characterizes what constitutes 'normal' behavior based on the analysis of a large number/set of different measures of a device's network behavior. The cyber defense system can build a sophisticated 'pattern of life'—that understands what represents normality for every person, device, email activity, and network activity in the system being protected by the cyber defense system.

As discussed, each machine learning model may be trained on specific aspects of the normal pattern of life for the system such as devices, users, network traffic flow, outputs from one or more cyber security analysis tools analyzing the system, email contact associations for each user, email characteristics, etc. The one or more machine learning models may use at least unsupervised learning algorithms to establish what is the normal pattern of life for the system. The machine learning models can train on both i) the historical normal distribution of alerts and events for that system as well as ii) factored in is a normal distribution information from similar peer systems to establish the normal pattern of life of the behavior of alerts and/or events for that system. Another set of machine learning models train on characteristics of emails and the activities and behavior of its email users to establish a normal for these.

Note, when the models leverage at least two different approaches to detecting anomalies: e.g. comparing each system's behavior to its own history, and comparing that system to its peers' history and/or e.g. comparing an email to both characteristics of emails and the activities and behavior of its email users, this multiple source comparison allows the models to avoid learning existing bad behavior as 'normal' because compromised devices/users/components/emails will exhibit behavior different to their immediate peers.

In addition, the one or more machine learning models can use the comparison of i) the normal pattern of life for that system corresponding to the historical normal distribution of alerts and events for that system mapped out in the same multiple dimension space to ii) the current chain of individual alerts and events behavior under analysis. This comparison can yield detection of the one or more unusual patterns of behavior within the plotted individual alerts and/or events, which allows the detection of previously unidentified cyber threats compared to finding cyber threats with merely predefined descriptive objects and/or signatures. Thus, increasingly intelligent malicious cyber threats that try to pick and choose when they take their actions in order to generate low level alerts and event will still be detected, even though they have not yet been identified by other methods of cyber analysis. These intelligent malicious cyber threats can include malware, spyware, key loggers, malicious links in an email, malicious attachments in an email, etc. as well as nefarious internal information technology staff who know intimately how to not set off any high level alerts or events.

In essence, the plotting and comparison is a way to filter out what is normal for that system and then be able to focus the analysis on what is abnormal or unusual for that system. Then, for each hypothesis of what could be happening with the chain of unusual events and/or alerts, the gatherer module may gather additional metrics from the data store including the pool of metrics originally considered 'normal behavior' to support or refute each possible hypothesis of what could be happening with this chain of unusual behavior under analysis.

Note, each of the individual alerts and/or events in a chain of alerts and/or events that form the unusual pattern can indicate subtle abnormal behavior; and thus, each alert and/or event can have a low threat risk associated with that individual alert and/or event. However, when analyzed as a distinct chain/grouping of alerts and/or events behavior forming the chain of unusual pattern by the one or more machine learning models, then that distinct chain of alerts and/or events can be determine to now have a much higher threat risk than any of the individual alerts and/or events in the chain.

Note, in addition, today's cyberattacks can be of such severity and speed that a human response cannot happen quickly enough. Thanks to these self-learning advances, it is now possible for a machine to uncover these emerging threats and deploy appropriate, real-time responses to fight back against the most serious cyber threats.

The cyber defense system has the ability to self-learn and detect normality in order to spot true anomalies, allowing organizations of all sizes to understand the behavior of users and machines on their networks at both an individual and group level. Monitoring behaviors, rather than using pre-defined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine, email, and human activity behaviorally, at and after the point of compromise, in order to predict and catch today's increasingly sophisticated cyber-attack vectors. It is thus possible to computationally establish what is normal, in order to then detect what is abnormal. In addition, the machine learning constantly revisits assumptions about behavior, using probabilistic mathematics. The cyber defense system's unsupervised machine learning methods do not require training data with pre-defined labels. Instead, they are able to identify key patterns and trends in the data, without the need for human input.

FIG. 4 illustrates a block diagram of an embodiment of an email module and/or cyber threat module factoring in many factors including an email content behavioral anomaly, a network behavioral anomaly, email recipients, and an email inbound or outbound direction, and then cooperating with the one or more mathematical models in order to compare the email, based on multiple aspects of the email, in order to determine a threat posed by the outbound email and its attachments and/or links.

FIG. 5 illustrates a block diagram of an embodiment of an email module and/or cyber threat module factoring in many other example factors including an email content behavioral anomaly, a formatting of the email behavioral anomaly, email generation in or out of the workplace, email properties including attached or linked files, and an email type, and then cooperating with the one or more mathematical models in order to compare the email, based on multiple aspects of the email, in order to determine a threat posed by the outbound email and its attachments and/or links.

The email module communicates with the network module to receive information about links and external locations accessed by internal users, which it combines with its own intelligence about links observed in email traffic, all of which is stored in a compressed manner and can be queried to establish whether something is 'rare'. The system can keep a rolling 'memory' of domains seen by the email module within emails and from links as well as host domains seen by the network module on the network, allowing the email module to correlate the two.

Defense System

FIG. 8 illustrates a block diagram of an embodiment of an example cyber defense system protecting an example network. The example network FIG. 8 illustrates a network of computer systems 50 using a cyber defense system. The system depicted by FIG. 8 is a simplified illustration, which is provided for ease of explanation of the invention. The system 50 comprises a first computer system 10 within a building, which uses the cyber defense system to detect and thereby attempts to prevent threats to computing devices within its bounds. The first computer system 10 comprises three computing devices 1, 2, 3, a local server 4, and a multifunctional device 5 that provides printing, scanning and facsimile functionalities to each of the computing devices 1, 2, 3. All of the devices within the first computer system 10 are communicatively coupled via a Local Area Network 6. Consequently, all of the computing devices 1, 2, 3 are able to access the local server 4 via the LAN 6 and use the functionalities of the MFD 5 via the LAN 6.

The LAN 6 of the first computer system 10 is connected to the Internet 20, which in turn provides computing devices 1, 2, 3 with access to a multitude of other computing devices including server 30 and second computer system 40. Second computer system 40 also includes two computing devices 41, 42, connected by a second LAN 43.

In this exemplary embodiment, computing devices 1, 2, 3 and 41 and 42 have the have an instance of the endpoint agent extension and therefore run the threat detection methods described herein. As such, each computing system comprises a processor arranged to run the steps of the process described herein, memory required to store information related to the running of the process, as well as a network interface for collecting the required information. This method shall now be described in detail with reference to FIG. 8.

The computing devices build and maintain a dynamic, ever-changing model of the 'normal behavior' of each user and machine within the system 10 and each user using that computing device. The approach is based on Bayesian mathematics, and monitors all interactions, events and communications within the system 10—which computer is talking to which, files that have been created, networks that are being accessed.

For example, computing device 2 is based in a company's San Francisco office and operated by a marketing employee who regularly accesses the marketing network, usually communicates with machines in the company's U.K. office in second computer system 40 between 9:30 AM and midday, and is active from about 8:30 AM until 6 PM. The same employee virtually never accesses the employee time sheets, very rarely connects to the company's Atlanta network and has no dealings in South-East Asia. The cyber defense system takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The cyber defense system is built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively-simple policing process. These sophisticated attackers look for activity that is not directly associated with the user's input. As an APT (Advanced Persistent Threat) attack typically has very long mission windows of weeks, months or years, such processor cycles can be stolen so infrequently that they do not impact machine performance. But, however cloaked and sophisticated the attack is, there will always be a measurable delta, even if extremely slight, in typical machine behavior, between pre and post compromise. This behavioral delta can be observed and acted on with the form of Bayesian mathematical analysis used by the cyber defense system installed on the computer 1.

This intelligent system is capable of making value judgments and carrying out higher value, more thoughtful tasks. Machine learning requires complex algorithms to be devised and an overarching framework to interpret the results produced. However, when applied correctly these approaches can facilitate machines to make logical, probability-based decisions and undertake thoughtful tasks.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Computing Systems

FIG. 9 illustrates a diagram of an example endpoint computing device that can implement an instance of the endpoint agent extension of a cyber defense system for email that includes two or more modules and cooperates with machine learning models.

Components of the endpoint computing device can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures. See FIG. 2 for a number of example endpoint computing devices.

The endpoint computing device typically includes a variety of computing machine-readable media. Computing machine-readable media can be any available media that can be accessed by endpoint computing device and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media, such as wireless channels, are not included in the machine-readable media. Communication media typically embody computer readable instructions, data structures, other executable software, or other transport mechanism and includes any information delivery media.

It should be noted that the present design can be carried out on a single endpoint computing device and/or on a distributed system in which different portions of the present design are carried out on different parts of the distributed endpoint computing device.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices. It has proven convenient at times, principally for reasons of common usage, to refer to these signals as bits, values, elements, symbols, characters, terms, numbers, or the like. These algorithms can be written in a number of different software programming languages such as Python, C, C++, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An apparatus, comprising:
an endpoint agent extension of a cyber defense system for email that includes two or more modules that are configure to cooperate with one or more machine learning models, comprising:
an integration module of the endpoint agent extension configured to integrate the endpoint agent extension with an email client application on an endpoint computing device to detect email cyber threats in emails in the email client application as well as regulate outbound emails;
an action module of the endpoint agent extension configured to interact with the email client application to direct autonomous actions, by the action module rather than a human taking an action, against at least an outbound email including its attached files and/or linked files under analysis when a cyber threat module determines the outbound email including its attached files and/or linked files (a) to be a data exfiltration threat, (b) to be both malicious and anomalous behavior as compared to a user's modeled email behavior, or (c) a combination of these two determinations, where the autonomous actions, against at least the outbound email and the files, include two or more actions selected from a group consisting of i) logging a user off the email client application, ii) preventing the sending of the outbound email, iii) stripping the attached files and/or disabling the link to the files from the outbound email, and iv) sending a notification to cyber security personnel of an organization regarding the outbound email; and
a secure communications module in the endpoint agent extension configured to securely communicate with one or more modules in a cyber security appliance of the cyber defense system located in a network connected to the endpoint computing device, an email module in the cyber security appliance is configured to reference the one or more machine learning models that are trained on the normal behavior of email activity and user activity associated with at least the email system, where the email module determines a threat risk parameter that factors in a likelihood that a chain of two or more unusual behaviors of the email activity and user activity under analysis fall outside of derived normal benign behavior; and thus, are likely malicious behavior, where the action module, the secure communications module, and the integration module are part of the two or more modules of the endpoint agent extension, where when portions of i) the endpoint agent extension and ii) any modules are implemented in software, then their instructions are stored in one or more non-transitory machine readable storage mediums in a format when executed by the endpoint computing device to cause said endpoint computing device to perform operations listed for the apparatus.

2. The apparatus of claim 1, further comprising:
an attachment analyzer of the endpoint agent extension that is configured to scan a file i) attached to and/or ii) linked to the outbound email that is about to be sent in an outbox, in order to analyze content and meta data of the file via investigation of the file structure, a meta data analysis tool, and machine learning analysis to gather information about the file itself and the content in the file.

3. The apparatus of claim 1, further comprising:
wherein the endpoint agent extension is implemented as one of i) a plug-in integration for the email client application and ii) a browser extension for integration with a browser-based email client application.

4. The apparatus of claim 1, further comprising:
where the modules of the endpoint agent extension are configured to receive and factor in, both knowledge outside an email domain as well as metrics and other information from the email domain, collected by the one or more modules of the cyber defense appliance located on the network, where the modules of the endpoint agent extension also are configured to use the computing power of the one or more modules of the cyber defense appliance for one or more of the machine learning models, where the endpoint agent extension uses both the external computing power and additional knowledge collected outside the email domain in order to analyze contextual information about the outbound email under analysis, about user behavior of the user generating the outbound email, and/or about a particular file i) attached to or ii) linked to the outbound email.

5. The apparatus of claim 4, further comprising:
where the cyber defense appliance of the cyber threat defense system is located in an IT network, an OT network, a SaaS environment, a cloud network, and/or any combination of these networks, to exchange secure communications with the endpoint agent extension to provide additional contextual information about user behavior outside the email domain, contextual information about attached files to the email under analysis to determine whether the outbound email under analysis and its attachments and/or links either i) are unusual or ii) are not unusual in context of a current user's behavior under analysis, to prevent incidents of data loss as well as wrongly addressed recipients.

6. The apparatus of claim 4, further comprising:
where the email module of the cyber security appliance is configured to cooperate with the one or more machine learning models in the cyber security appliance to perform machine learning analysis on all inbound and outbound email flow for an organization to develop an awareness of a pattern-of-life for i) each individual user, ii) the organization as a whole, and iii) clustered groups of users the machine learning identifies as being closely associated with a given user, where the email module is configured to convey this information to the modules in the endpoint agent extension through the secure communications module.

7. The apparatus of claim 1, further comprising:
where the secure communications module in the endpoint agent extension is configured to securely communicate with one or more modules in a cyber security appliance of the cyber defense system located in a network connected to the endpoint computing device in order to receive contextual information outside an email domain about the outbound email under analysis, as well as take instructions or receive additional information from an autonomous response module of the cyber security appliance regarding what autonomous action to take against the outbound email to mitigate a threat posed by the outbound email and its attachments and/or links.

8. The apparatus of claim 1, further comprising:
where the endpoint agent extension and a cyber security appliance on a network cooperate to track and maintain a dynamic profile modeled for each email user in a domain who compose emails, which is 1) derived from a pattern-of-life for i) a corresponding email user in the email domain, ii) an organization that the individual user of the email domain is a part of, and iii) smaller clustered peer groups who have close associations with a given user on a per user basis, as well as 2) factor in network metrics with email domain metrics to make a decision that the behavior is deviating from the pattern-of-life for the email under analysis and any of its files attached or linked, where the cyber security appliance is configured to convey this information to the modules in the endpoint agent extension through the secure communications module.

9. The apparatus of claim 1, further comprising:
where the email module in the network cyber security appliance is configured to track and maintain a dynamic profile modeled in a user model for each email user in the domain who compose emails, as well as cooperate with a model of email and network activities of each peer group in an organization as well as a model of an organization's email activity in general, where the inputs from all three of these different modeled insights is factored into the dynamic profile when making a decision whether the outbound email by the user is unusual and triggers a further analysis, and
wherein the secure communications module in the endpoint agent extension is configured to securely receive an instance of a dynamic profile, for each email user in the domain who composes emails, as well as a memory to store the instances of dynamic profiles for each of the users on the end point device for quicker processing of each outbound mail under analysis, where the email module is configured to generate the dynamic profiles sent to the secure communications module.

10. The apparatus of claim 1, further comprising:
where, in addition to directing actions to prevent (a) the data exfiltration threat, (b) the malicious and anomalous behavior threat, or (c) the combination of these two determinations, the action module of the endpoint agent extension is further configured to direct the autonomous actions against the outbound email and its files when additional determinations are made including (d) sending a notification to the user on whether they intend to send the outbound email to a deemed errant email recipient address, as well as (e) sending a notification to the user when the email under analysis including any attached or linked files is determined to violate an email policy implemented by an organization that contains the user.

11. A method for a cyber security system, comprising:
configuring an endpoint agent extension of the cyber defense system for email that includes two or more modules and that cooperates with one or more machine learning models to be installable on an endpoint computing device;
configuring the endpoint agent extension to integrate with an email client application on the endpoint computing device to detect email cyber threats in emails in the email client application as well as regulate outbound emails;
configuring the endpoint agent extension to interact with the email client application to direct autonomous actions, by the action module rather than a human taking an action, against at least an outbound email including its attached files and/or linked files under analysis when a cyber threat module determines the outbound email including its attached files and/or linked files (a) to be a data exfiltration threat, (b) to be both malicious and anomalous behavior as compared to a user's modeled email behavior, or (c) a combination of these two determinations, where the autonomous actions, against at least the outbound email and the files, include two or more actions selected from a group consisting of i) logging a user off the email client application, ii) preventing the sending of the outbound email, iii) stripping the attached files and/or disabling the link to the files from the outbound email, and iv) sending a notification to cyber security personnel of an organization regarding the outbound email;
configuring a secure communications module in the endpoint agent extension to securely communicate with one or more modules in a cyber security appliance of the cyber defense system located in a network connected to the endpoint computing device, and configuring an email module in the cyber security appliance to reference the one or more machine learning models that are trained on the normal behavior of email activity and user activity associated with at least the email system, where the email module determines a threat risk parameter that factors in a likelihood that a chain of two or more unusual behaviors of the email activity and user activity under analysis fall outside of derived normal benign behavior; and thus, are likely malicious behavior, where the action module, the secure communications module, and the integration module are part of the two or more modules of the endpoint agent extension, where when portions of i) the endpoint agent extension and ii) any modules are implemented in software, then their instructions are stored in one or more non-transitory machine readable storage mediums in a format when executed by the endpoint computing device to cause said endpoint computing device to perform operations listed for the method.

12. The method of claim 11, further comprising:
configuring the endpoint agent extension to scan a file i) attached to and/or ii) linked to the outbound email that is about to be sent in an outbox, in order to analyze content and meta data of the file via investigation of the file structure, a meta data analysis tool, and machine learning analysis to gather information about the file itself and the content in the file.

13. The method of claim 11, further comprising:
wherein the endpoint agent extension is implemented as one of i) a plug-in integration for the email client application and ii) a browser extension for integration with a browser-based email client application.

14. The method of claim 11, further comprising:
configuring the endpoint agent extension to securely receive and factor in, both knowledge outside an email domain as well as metrics and other information from the email domain, collected by the one or more modules of the cyber defense appliance located on the network, where the modules of the endpoint agent extension also are configured to use the computing power of the one or more modules of the cyber defense appliance for one or more of the machine learning models, where the endpoint agent extension uses both the external computing power and additional knowledge collected outside the email domain in order to analyze contextual information about the outbound email under analysis, about user behavior of the user generating the outbound email, and/or about a particular file i) attached to or ii) linked to the outbound email.

15. The method of claim 14, further comprising:

where the cyber defense appliance of the cyber threat defense system is located in an IT network, an OT network, a SaaS environment, a cloud network, and/or any combination of these networks, to exchange secure communications with the endpoint agent extension to provide additional contextual information about user behavior outside the email domain, contextual information about attached files to the email under analysis to determine whether the outbound email under analysis and its attachments and/or links either i) are unusual or ii) are not unusual in context of a current user's behavior under analysis, to prevent incidents of data loss as well as wrongly addressed recipients.

16. The method of claim 14, further comprising:

configuring the email module in the cyber security appliance to cooperate with the one or more machine learning models in the cyber security appliance to perform machine learning analysis on all inbound and outbound email flow for an organization to develop an awareness of a pattern-of-life for i) each individual user, ii) the organization as a whole, and iii) clustered groups of users the machine learning identifies as being closely associated with a given user, and then conveying this information to the modules in the endpoint agent extension through a secure communications module.

17. The method of claim 11, further comprising:

configuring the endpoint agent extension to securely communicate with one or more modules in a cyber security appliance of the cyber defense system located in a network connected to the endpoint computing device in order to receive contextual information outside an email domain about the outbound email under analysis, as well as take instructions or receive additional information from an autonomous response module of the cyber security appliance regarding what autonomous action to take against the outbound email to mitigate a threat posed by the outbound email and its attachments and/or links.

18. The method of claim 11, further comprising:

configuring the endpoint agent extension and a cyber security appliance on a network to track and maintain a dynamic profile modeled for each email user in a domain who compose emails, which is 1) derived from a pattern-of-life for i) a corresponding email user in the email domain, ii) an organization that the individual user of the email domain is a part of, and iii) smaller clustered peer groups who have close associations with a given user on a per user basis, as well as 2) factor in network metrics with email domain metrics to make a decision that the behavior is deviating from the pattern-of-life for the email under analysis and any of its files attached or linked.

19. The method of claim 11, further comprising:

tracking and maintaining a dynamic profile modeled in a user model for each email user in the domain who compose emails, as well as cooperate with a model of email and network activities of each peer group in an organization as well as a model of an organization's email activity in general, where the inputs from all three of these different modeled insights is factored into the dynamic profile when making a decision whether the outbound email by the user is unusual and triggers a further analysis.

20. A non-transitory computer readable medium containing instructions, which when executed by a computing machine to cause said computing machine to perform the method of claim 11.

\* \* \* \* \*